United States Patent
Miller et al.

(10) Patent No.: US 12,235,865 B1
(45) Date of Patent: Feb. 25, 2025

(54) NO-CODE CONFIGURATION OF DATA VISUALIZATION ACTIONS FOR EXECUTION OF PARAMETERIZED REMOTE WORKFLOWS WITH DATA CONTEXT VIA API

(71) Applicant: Salesforce, Inc., San Francisco, CA (US)

(72) Inventors: Matthew Mark Miller, Wheaton, IL (US); Kaushal Manhar Joshi, Sunnyvale, CA (US); Ridhima Gupta, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/878,821

(22) Filed: Aug. 1, 2022

(51) Int. Cl.
*G06F 16/26* (2019.01)
*G06F 9/54* (2006.01)
*G06F 16/54* (2019.01)

(52) U.S. Cl.
CPC .............. *G06F 16/26* (2019.01); *G06F 9/547* (2013.01)

(58) Field of Classification Search
CPC ................................ G06F 16/26; G06F 9/547
USPC .......................................................... 707/791
See application file for complete search history.

(56) References Cited

U.S. PATENT DOCUMENTS

| | | | |
|---|---|---|---|
| 7,703,021 B1 | 4/2010 | Flam | |
| 8,099,674 B2 * | 1/2012 | Mackinlay | G06F 16/2393 715/764 |
| 8,375,014 B1 | 2/2013 | Brocato et al. | |
| 10,515,121 B1 | 12/2019 | Setlur et al. | |
| 10,546,001 B1 | 1/2020 | Nguyen | |
| 10,558,688 B1 | 2/2020 | Nguyen et al. | |
| 10,949,444 B2 | 3/2021 | Keahey | |
| 11,270,483 B1 | 3/2022 | Chilamakuri | |
| 11,604,794 B1 | 3/2023 | Nallapati | |
| 2005/0080770 A1 | 4/2005 | Lueder et al. | |
| 2006/0069605 A1 * | 3/2006 | Hatoun | G06Q 10/0633 705/7.26 |
| 2009/0313576 A1 | 12/2009 | Neumann et al. | |

(Continued)

OTHER PUBLICATIONS

Atallah, Office Action, U.S. Appl. No. 17/368,783, Dec. 27, 2021, 38 pgs.

(Continued)

*Primary Examiner* — Kuen S Lu
(74) *Attorney, Agent, or Firm* — Morgan, Lewis & Bockius LLP

(57) ABSTRACT

A computing device displays, in a graphical user interface corresponding to a data visualization application, a dashboard having one or more data visualizations related to a data source. The device receives a user interaction with a first data visualization of the dashboard. The device compares the user interaction to a set of stored trigger actions and determines, based on the comparing, that the user interaction corresponds to a predefined trigger to initiate a workflow action to be executed by an external service, distinct from the data visualization application. In accordance with the determination, the device identifies parameters of a predefined action template corresponding to the workflow action. The device extracts a subset of data from the data source, corresponding to the parameters. The device maps the subset of data to the parameters of the action template and initiates execution of the external service.

20 Claims, 30 Drawing Sheets

(56) References Cited

U.S. PATENT DOCUMENTS

| | | | |
|---|---|---|---|
| 2010/0312602 A1 | 12/2010 | McLoughlin | |
| 2011/0173680 A1* | 7/2011 | Bates | G06Q 10/10 |
| | | | 706/46 |
| 2014/0040871 A1 | 2/2014 | Schwan et al. | |
| 2014/0229497 A1 | 8/2014 | Wolfram | |
| 2014/0244625 A1 | 8/2014 | Seghezzi et al. | |
| 2014/0317155 A1 | 10/2014 | Treibach-Heck | |
| 2015/0100588 A1 | 4/2015 | Allen et al. | |
| 2016/0224804 A1 | 8/2016 | Carasso | |
| 2016/0232537 A1 | 8/2016 | Nonez et al. | |
| 2016/0283091 A1 | 9/2016 | Hang et al. | |
| 2017/0308571 A1* | 10/2017 | McCurley | G06F 16/243 |
| 2018/0329948 A1 | 11/2018 | Nijor et al. | |
| 2019/0179495 A1 | 6/2019 | Watanabe et al. | |
| 2019/0362009 A1 | 11/2019 | Miseldine et al. | |
| 2020/0012638 A1 | 1/2020 | Luo et al. | |
| 2020/0089700 A1 | 3/2020 | Ericson et al. | |
| 2020/0089760 A1 | 3/2020 | Ericson et al. | |
| 2020/0097302 A1 | 3/2020 | Deutch | |
| 2020/0104401 A1 | 4/2020 | Burnett et al. | |
| 2020/0110779 A1* | 4/2020 | Setlur | G06F 16/248 |
| 2020/0110803 A1 | 4/2020 | Djalali et al. | |
| 2020/0134103 A1 | 4/2020 | Mankovskii | |
| 2020/0134641 A1 | 4/2020 | Morgan et al. | |
| 2020/0134683 A1 | 4/2020 | Boren et al. | |
| 2020/0174755 A1 | 6/2020 | Rose et al. | |
| 2020/0236013 A1* | 7/2020 | Mocanu | G06F 9/50 |
| 2020/0293167 A1 | 9/2020 | Blyumen | |
| 2020/0334238 A1 | 10/2020 | Sherman | |
| 2020/0380432 A1 | 12/2020 | Wang et al. | |
| 2021/0117056 A1 | 4/2021 | Kuo et al. | |
| 2021/0182283 A1 | 6/2021 | Carney et al. | |
| 2021/0224328 A1 | 7/2021 | Schrupp et al. | |
| 2021/0225529 A1 | 7/2021 | Viengkham et al. | |
| 2021/0232920 A1 | 7/2021 | Parangi et al. | |
| 2021/0342125 A1 | 11/2021 | Burnett | |
| 2021/0342338 A1 | 11/2021 | Nocedal de la Garza | |
| 2021/0342785 A1 | 11/2021 | Mann | |
| 2021/0349581 A1* | 11/2021 | Egozi | G06Q 10/103 |
| 2021/0406325 A1 | 12/2021 | Sinn et al. | |
| 2022/0050695 A1 | 2/2022 | Gajendran et al. | |
| 2022/0358286 A1 | 11/2022 | Wilson-Thomas et al. | |
| 2022/0405314 A1 | 12/2022 | Du | |
| 2023/0109718 A1* | 4/2023 | Polen | G06F 16/211 |
| | | | 707/803 |

OTHER PUBLICATIONS

Atallah, Final Office Action, U.S. Appl. No. 17/368,783, Jul. 25, 2022, 26 pgs.

Atallah, Office Action, U.S. Appl. No. 17/357,912, Feb. 1, 2022, 25 pgs.

Atallah, Notice of Allowance, U.S. Appl. No. 17/357,912, Jul. 8, 2022, 12 pgs.

Atallah, Office Action, U.S. Appl. No. 17/473,992, Jun. 14, 2023, 42 pgs.

D. Song et al., "Building and Querying an Enterprise Knowledge Graph," in IEEE Transactions on Services Computing, Vpl. 12, No. 3, pp. 356-369, May 1-Jun. 2019, doi: 10.1109/TSC.2017.2711600, (Year 2019).

F.Siasar Djahantighi, M. Norouzifard, S.H. Davarpanah and M.H. Shenassa, "Using Natural Language Processing in Order to Create SQL queries," 2008 International Conference on Computer and Communication Engineering, 2008, pp. 600-604, doi: 10.1109/ICCCE.2008.458067, (Year 2008).

Gao, Tong, et al. "Datatone: Managing ambiguity in natural language interfaces for data visualization." Proceedings of the 28th annual acm symposium on user interface software & technology. 2015, pp. 489-500. (Year: 2015).

Mannheimer, Office Action, U.S. Appl. No. 17/521,820, Jan. 13, 2023, 18 pgs.

Mannheimer, Final Office Action, U.S. Appl. No. 17/521,820, May 8, 2023, 21 pgs.

Mavin, Alistair, et al. "Easy approach to requirements syntax (EARS)." 2009 17th IEEE International Requirements Engineering Conference. IEEE, 2009, pp. 317-322 (Year: 2009).

Mazo, Rall, et al. "Towards a new template for the specification of requirements in semi-structured natural language." Journal of Software Engineering Research and Development 8 (2020), pp. 1-16 (Year: 2020).

Setlur, Vidya, et al. "Eviza: A natural language interface for visual analysis." Proceedings of the 29th annual symposium on user interface software and technology. 2016, p. 365-377. (Year: 2016).

Atallah, Office Action, U.S. Appl. No. 17/368,783, Oct. 6, 2023, 30 pgs.

Atallah, Final Office Action, U.S. Appl. No. 17/473,992, Nov. 2, 2023, 50 pgs.

Atallah, Notice of Allowance, U.S. Appl. No. 17/473,992, Jul. 5, 2024, 16 pgs.

Atallah, Final Office Action, U.S. Appl. No. 17/474,018, Sep. 5, 2024, 26 pgs.

Atallah, Notice of Allowance U.S. Appl. No. 17/368,783, Mar. 28, 2024, 9 pgs.

Atallah, Office Action, U.S. Appl. No. 17/474,018, Jan. 3, 2024, 17 pgs.

Atallah, Office Action, U.S. Appl. No. 17/474,018, May 30, 2024, 22 pgs.

Dashevsky, "23 Cool Non-Math Things You Can Do With Wolfram Alpha", https://www.pcmag.com/news/23-cool-non-math-things-you-can-do-with-wolfram-alpha, May 16, 2016. (Year: 2016).

* cited by examiner

Figure 8P

NO-CODE CONFIGURATION OF DATA VISUALIZATION ACTIONS FOR EXECUTION OF PARAMETERIZED REMOTE WORKFLOWS WITH DATA CONTEXT VIA API

RELATED APPLICATIONS

This application is related to the following applications, each of which is incorporated by reference herein in its entirety:
  (i) U.S. patent application Ser. No. 17/357,912, filed Jun. 24, 2021, entitled "Using a Natural Language Interface to Generate Dashboards Corresponding to Selected Data Sources";
  (ii) U.S. patent application Ser. No. 17/368,783, filed Jul. 6, 2021, entitled "Using a Natural Language Interface to Explore Entity Relationships for Selected Data Sources";
  (iii) U.S. patent application Ser. No. 17/473,992, filed Sep. 13, 2021, entitled "Using a Natural Language Interface to Correlate User Intent with Predefined Data Analysis Templates for Selected Data Sources"; and
  (iv) U.S. patent application Ser. No. 17/474,018, filed Sep. 13, 2021, entitled "Generating Data Analysis Dashboard Templates for Selected Data Sources."

TECHNICAL FIELD

The disclosed implementations relate generally to data visualization and more specifically to systems, methods, and user interfaces that enable users to interact with data visualizations and data visualization dashboards.

BACKGROUND

Data visualization applications enable a user to understand a data set visually and interact with data visualizations. Visual analyses of data sets, including distribution, trends, outliers, and other factors are important to making business decisions. Some data sets are very large or complex, and include many data fields. Some data elements are computed based on data from a selected data set. Various tools can be used to help understand and analyze the data, including dashboards that have multiple data visualizations and natural language interfaces that help with visual analytical tasks.

SUMMARY

Data visualization applications are increasingly viewed as more than just a "dashboard factory." For example, users expect data visualization dashboards to provide an analytical workbench that can visualize data from databases and applications, then drive immediate connection, communication, and execution of other (e.g., external) workflows.

Currently, users of interactive data visualizations find themselves unable to take the next actions without either switching to an entirely different application or writing software code to integrate the dashboards with the workflows they want to execute. Furthermore, although no-code "integration" applications (e.g., platforms) that allow some clickable configuration of relationships (including triggers) between software are available commercially, this configuration is divorced from the user's context (e.g., the data visualization dashboard).

Accordingly, there is a need for improved systems, methods, and devices that provide a bridge between a data visualization platform and other workflows.

Some aspects of the present disclosure provide a no-code mechanism for self-service configuration of the relationship between the data visualization context and an external workflow. For example, some implementations include methods and systems that enable an author of a data visualization dashboard to take further actions on insights gained from the data visualization dashboard.

As disclosed herein, an author of a visualization dashboard can, without writing any code, drag, drop, and click to configure an action (e.g., a workflow action or dashboard action) at design-time. The workflow action is an extension to the data visualization dashboard, and contains the metadata for the trigger of the action (e.g., on click, on parameter entry, or on mark selection) as well as the data mapping between the dashboard data context and the parameters on the external workflow.

As disclosed herein, at run-time, an end user can execute the workflow based on the current data context, simply by triggering the workflow via the mechanism configured by the author. The end user does not have to know or write any code to execute the workflow. In some implementations, the actions that are executed are driven by an external workflow engine. In some implementations, the data visualization dashboard provides a gallery for browsing and searching these workflows in order to facilitate the self-service no-code configuration.

The systems and methods disclosed herein provide several benefits to users. For example, the data visualization platform becomes significantly more valuable to users because users can easily take action from data, by creating and using customized data-driven workflows that interact with other systems (e.g., operational systems, business systems, and customer relationship management systems), thereby leading to higher productivity and better user satisfaction. The data visualizations themselves also become more valuable and useful to users, because the visualizations can be more easily integrated into other business systems. Furthermore, once a dashboard action has been configured (e.g., by a dashboard author), it can be reused by different end users. A user that interacts with data visualizations can invoke a dashboard action whenever the need arises.

Accordingly, the disclosed systems and methods improve user experience and satisfaction, by making the cycle of visual analysis smoother (e.g., less disjointed) and faster.

The systems, methods, and devices of this disclosure each has several innovative aspects, no single one of which is solely responsible for the desirable attributes disclosed herein.

In accordance with some implementations, a method executes remote workflows using analytical dashboards. The method is performed at a computing device. The computing device includes a display, one or more processors, and memory. The memory stores one or more programs configured for execution by the one or more processors. The method includes displaying, in a graphical user interface corresponding to a data visualization application, a dashboard having one or more data visualizations related to a data source. The method includes receiving user interaction with a first data visualization of the dashboard. The method includes comparing the user interaction to a set of stored trigger actions. The method includes determining, based on the comparing, that the user interaction corresponds to a predefined trigger to initiate a workflow action to be executed by an external service, distinct from the data visualization application. The method includes, in accordance with the determination, identifying parameters of a predefined action template corresponding to the workflow action. The method includes extracting a subset of data from the data source, corresponding to the parameters. The method includes mapping the subset of data to the parameters of the action template. The method includes initiating execution of the external service. In response, the external service executes the workflow action in accordance with the action template and the mapped parameters.

In some implementations, the user interaction includes at least one of: user selection of a data mark in the first data visualization or user selection of a predefined interface element of the dashboard.

In some implementations, the predefined trigger includes one of: user selection of a data mark in the first data visualization, detection of a parameter change in the one or more data visualizations, or user selection of an interactive element in the dashboard.

In some implementations, the subset of data includes: data values and/or data fields of the first data visualization, metadata associated with data values and/or data fields of the first data visualization, and/or one or more filters defined in the workflow action template.

In some implementations, extracting the subset of data from the data source includes collecting data from locally stored tuples corresponding to data marks of the one or more data visualizations.

In some implementations, the subset of data includes data having a first data type. Mapping the subset of data to the parameters includes transforming the data having the first data type to a data type that is compatible with the one or more inputs.

In some implementations, mapping the subset of data to the parameters includes transforming the cardinality of a first attribute in the first data visualization from a first cardinality to a second cardinality specified in the workflow action template.

In some instances, the first cardinality corresponds to the count of data points in the first data visualization. The second cardinality corresponds to the number of trigger actions.

In some implementations, the mapping is performed automatically via a semantic model of the data source.

In some implementations, the user interaction comprises user selection of one data mark in the first data visualization.

In some implementations, the user interaction comprises user selection of multiple data marks in the first data visualization. The method further comprises aggregating data for the multiple data marks into one workflow action to be executed by the external service.

In some implementations, the user interaction comprises user selection of multiple data marks in the first data visualization. The external service executes multiple workflows, each of the workflows corresponding to a respective selected data mark.

In some implementations, initiating execution of the external service includes calling one or more API functions provided by the external service.

In some implementations, the method further includes, after calling the one or more API functions, receiving from the external service a response indicating that the workflow action has been executed.

In some implementations, the method includes, after initiating execution of the external service, displaying a notification that the workflow action has been executed.

In some implementations, a computing device includes a display, one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to take actions on insights obtained from data visualization platforms.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization interfaces by enabling users to take actions on insights gleaned from data visualization dashboards, via the generation and initiation of customized data-driven workflows that interact with other systems outside of the data visualization application. Such methods and devices improve user interaction with the data visualization interface by improving productivity and user satisfaction. The data visualizations themselves also become more valuable and useful to users, because the visualizations can be more easily integrated into other business systems. Furthermore, once a dashboard action has been configured, it can be reused by many end-users. The dashboard action can be invoked whenever a user interacts with data visualizations.

Figure 1:
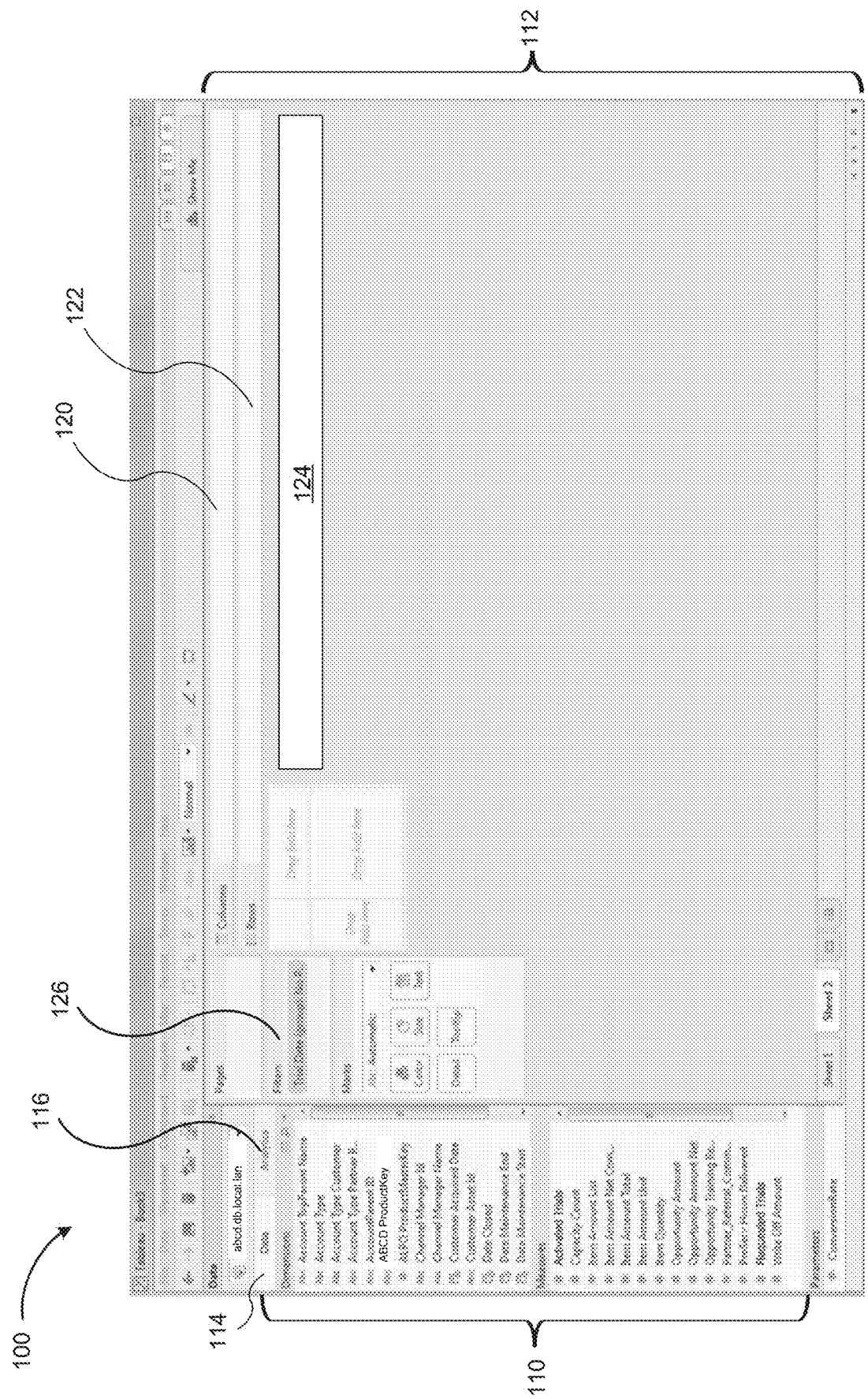
FIG. 1 shows a graphical user interface used in some implementations.

FIG. 1 shows a graphical user interface 100 for interactive data analysis according to some implementations. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the shelf regions determine characteristics of a desired data visualization. For example, a user can place field names into these shelf regions (e.g., by dragging fields from the schema information region 110 to the column shelf 120 and/or the row shelf 122), and the field names define the data visualization characteristics. A user may choose a vertical bar chart, with a column for each distinct value of a field placed in the column shelf region. The height of each bar is defined by another field placed into the row shelf region.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

In some implementations, the graphical user interface 100 displays a data visualization dashboard that includes one or more data visualizations.

Figure 2:
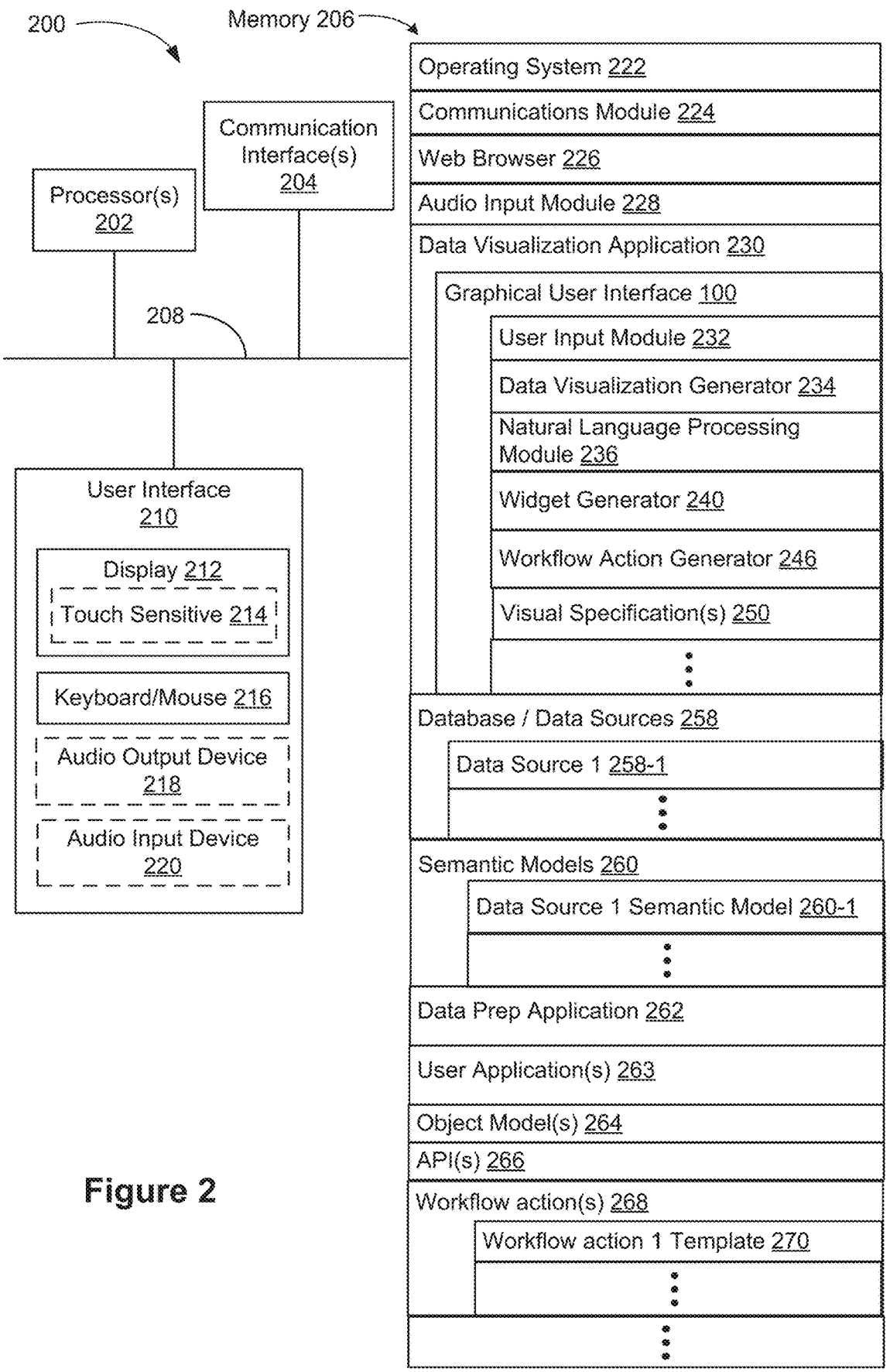
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language processing module 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 to identify one or more data sources 258 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generator 234, which automatically generates and displays a corresponding visual graphic (also referred to as a "data visualization" or a "data viz") using the user input (e.g., the natural language input);
  - a natural language processing module (or a natural language system) 236, which receives and parses the natural language input provided by the user. Further details of the natural language processing module 236 are described in U.S. patent application Ser. No. 17/357,912, filed Jun. 24, 2021, entitled "Using a Natural Language Interface to Generate Dashboards Corresponding to Selected Data Sources," which is incorporated by reference herein in its entirety;
  - a widget generator 240, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field;
  - a workflow action generator 246, which generates and/or configures workflow actions. This is discussed in further details with respect to FIGS. 4A-8P; and
  - visual specifications 250, which are used to define characteristics of a desired data visualization. In some implementations, the information the user provides (e.g., user input) is stored as a visual specification. In some implementations, the visual specifications 250 include previous natural language commands received from a user or properties specified by the user through natural language commands. In some instances, a visual specification 250 includes two or more aggregations based on different levels of detail;
- zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data sources, and uses the selected fields to define a visual graphic;
- zero or more semantic models 260 (e.g., a first semantic model 260-1), each of which is derived directly from a respective database or data source 258. The semantic model 260 represents the database schema and contains metadata about attributes. In some implementations, the semantic model 260 also includes metadata of alternative labels or synonyms of the attributes. The semantic model 260 includes data types (e.g., "text," "date," "geospatial," "Boolean," and "numeric"), attributes, (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon, which contains a set of analytical concepts found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values. Details of the grammar lexicon and the analytical concepts are described in U.S. patent application Ser. No. 17/357,912, filed Jun. 24, 2021, entitled "Using a Natural Language Interface to Generate Dashboards Corresponding to Selected Data Sources," which is incorporated by reference herein in its entirety;
- a data preparation application 262, which can be used to analyze and massage data for subsequent analysis (e.g., by the data visualization application 230);
- one or more user applications 263, which are executed locally or at a server system 300. In some implementations, the one or more user applications 263 include a messaging application (e.g., the Slack® application) or a customer relationship management application (e.g., Salesforce® CRM);

one or more object models 264, which identify the structure of the data sources 258. In an object model (or a data model), the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

APIs 266, which include functions and procedures that are called from one or more applications (e.g., from a web browser 226, a data visualization application 230, a data prep application 262, a data visualization web application 330, user applications 263, or other third party applications). The APIs translate the API calls into appropriate actions and perform one or more actions; and one or more workflow actions 268. In some implementations, a workflow action 268 includes a workflow action template 270, which specifies the inputs (from the data visualization dashboard) that are needed for the action.

In some implementations, the data visualization application 230 is configured to be operable in different levels of user account control, including an administrative mode, an author mode, and/or a user mode. In some implementations, as discussed with respect to FIGS. 8A-8P, in the author mode, an author of a data visualization dashboard can configure workflow actions to be executed by external services (e.g., third party applications). In some implementations, in the user mode, an end user can interact with a data visualization dashboard in accordance with the configurations specified by the dashboard author.

In some implementations, in the administrative mode, an administrator can:
  view workflow actions that have been created by authors in the Tableau environment;
  disable workflow actions at the site-level;
  administrate the workflow actions via APIs;
  control viewing and execution of existing workflow actions via Tableau's permissions infrastructure;
  enforce data residency rules relevant in the markets where Tableau Online is hosted; and/or
  review historical data for workflow executions.

In some implementations, in the author mode, an author of a data visualization dashboard can:
  add a button to a dashboard that executes arbitrary server-side code;
  invoke Salesforce® Flows from a workflow action;
  transition from the dashboard authoring environment to the action authoring environment;
  iterate over arrays of input values (e.g., tabular data from multiple mark selection);
  define input parameters that are required for workflow action invocation;
  define a flow with clicks—not code—that posts a binary to Slack®;
  build workflow actions that interact with binary data such as images and other binary attachments;
  perform create, read, update, and delete (CRUD) operations on workflow actions via APIs;
  define a flow with clicks—not code—that packages a dashboard in a branded template; and/or
  define how a workflow action is triggered (e.g., on click, on web hook, or on system event)

In some implementations, in the user mode, a user (e.g., an end user or a consumer) can:
  click on a button on a dashboard to execute a workflow action (e.g., a Salesforce® flow);
  click a button on a dashboard that sends a packaged, branded export of that dashboard to Slack® as a PowerPoint presentation and/or
  receive instantaneous visual feedback when a workflow action is executed.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
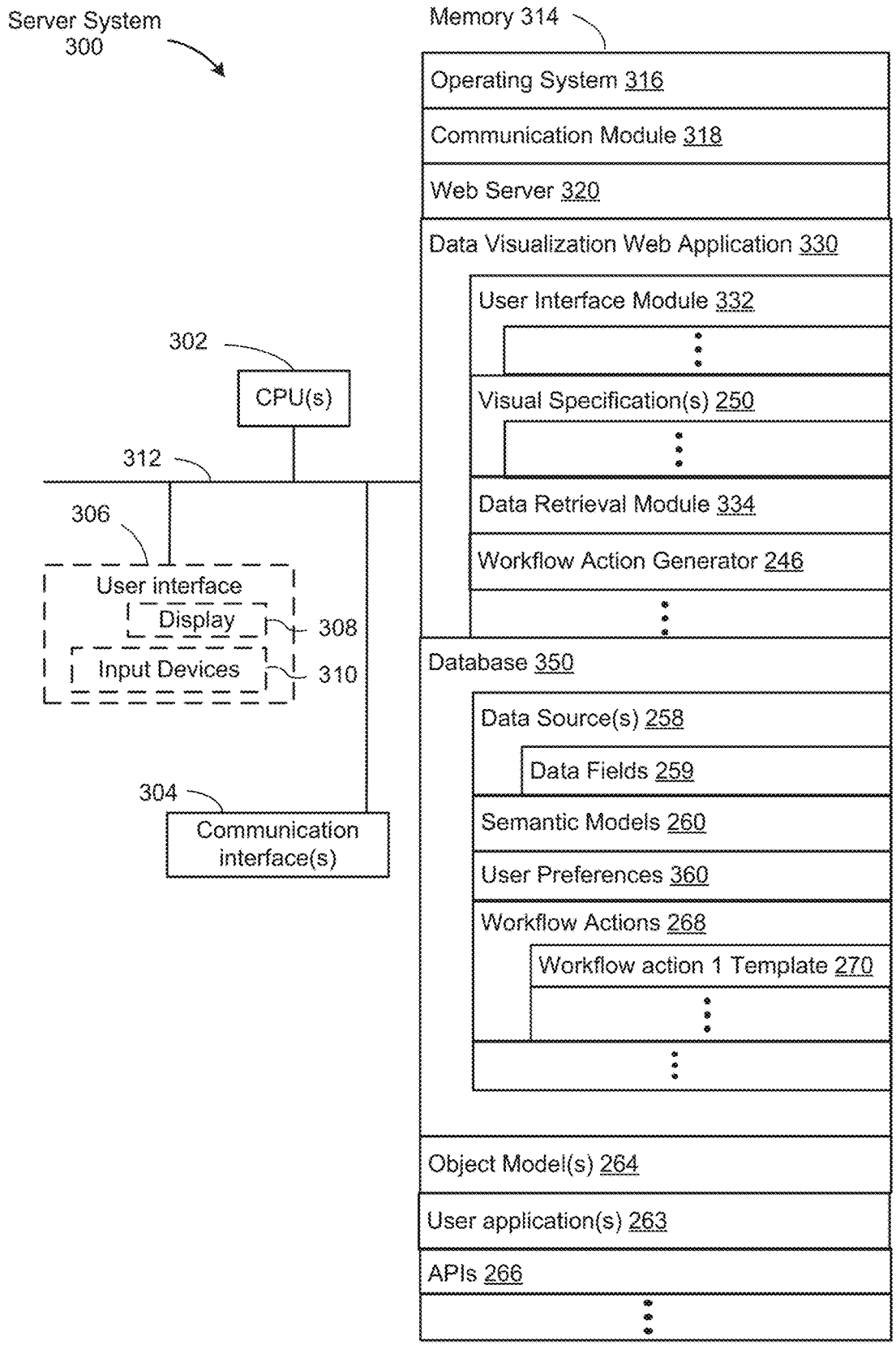
FIG. 3 is a block diagram of a server system according to some implementations.

FIG. 3 is a block diagram illustrating an example server system 300 in accordance with some implementations. In some implementations, the server system 300 is a data visualization server. The server system 300 typically includes one or more processing units/cores (CPUs) 302, one or more network interfaces 304, memory 314, and one or more communication buses 312 for interconnecting these components. In some implementations, the server system 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprise a non-transitory computer readable storage medium.

In some implementations, the memory 314 or the computer readable storage medium of the memory 314 stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 330, which may be downloaded and executed by a web browser 226 on a user's computing device 200. In general, a data visualization web application 330 has the same functionality as a desktop data visualization application 230, but provides the flexibility of access from any device at any location with network connectivity, and does not require installation and maintenance. In some implementations, the data visualization web application 330 includes various software modules to perform certain tasks. In some implementations, the web application 330 includes a user interface module 332, which provides the user interface for all aspects of the web application 330. In some implementations, the web application 330 includes a data retrieval module 334, which builds and executes queries to retrieve data from one or more data sources 258. The data sources 258 may be stored locally on the server system 300 or stored in an external database 350. In some implementations, data from two or more data sources may be blended. In some implementations, the data retrieval module 334 uses a visual specification 250 to build the queries. In some implementations, the visual specification includes one or more aggregate specifications;
- a workflow action generator 246, which generates and/or configures workflow actions. This is discussed in further details with respect to FIGS. 4A-8P;
- one or more databases 350, which store data used or created by the data visualization web application 330, the data visualization application 230, the workflow generator 246, the workflow generator 346, or the data prep application 262. The databases 350 may store data sources 258, which provide the data used in the generated data visualizations or predictive analytics. Each data source 258 includes one or more data fields 259. In some implementations, the database 350 stores user preferences 360. In some implementations, the database 350 includes a data visualization history log, which tracks each time the data visualization renders a data visualization. In some implementations, the database 350 stores semantic models 260. In some implementations, the database 350 stores one or more workflow actions 268. In some implementations, a workflow action 268 includes a workflow action template 270 that specifies the inputs (from the data visualization dashboard) that are needed for the action;
- zero or more object models 264, as described above for a client device 200;
- one or more user applications 263, which are executed at the server system 300. In some implementations, the one or more user applications 263 include a messaging application (e.g., the Slack® application) or a customer relationship management (CRM) application; and
- APIs 266, which provide functions and procedures that can be called from one or more applications (e.g., the web browser 226, the data visualization application 230, the data prep application 262, the data visualization web application 330, user applications 263, or other third party applications). The APIs translate the API calls into appropriate actions, and perform one or more actions.

The databases 350 may store data in many different formats, and commonly includes many distinct tables, each with a plurality of data fields 259. Some data sources comprise a single table. The data fields 259 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the data source 258. In some implementations, the database 350 stores a set of user preferences 360 for each user. The user preferences may be used when the data visualization web application 330 (or the data visualization application 230) makes recommendations about how to view a set of data fields 259. In some implementations, the database 350 stores a data visualization history log, which stores information about each data visualization generated. In some implementations, the database 350 stores other information, including other information used by the data visualization application 230, the data visualization web application 330, or the data prep application 262. The databases 350 may be separate from the server system 300, or may be included with the server system (or both).

In some implementations, the database 350 includes a data visualization history log and/or a visual analytics history log, which stores visual specifications 250. The history log may include a user identifier, a timestamp of when the data visualization and/or predictive model was created, a list of the data fields used in the data visualization and/or predictive model, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

In some implementations, the data visualization web application 330 is configured to be operable in different levels of user account control, including an administrative mode, an author mode, and/or a user mode. Please see discussion above with respect to the data visualization application 230.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server system 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server system 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" include various groups, collections, or arrays of servers that provide the described functionality, and the physical servers need not be physically colocated (e.g., the individual physical devices could be spread throughout the United States or throughout the world).

Workflow Actions

Some implementations enable building an administrative service in a data visual application (e.g., the data visual application 230 or the data visualization web application 330), for brokering bidirectional communication between the data visualization application 230 (or the data visualization server 300) and a third-party action engine.

Some implementations enable a monitoring, permissions, and governance layer (e.g., in the data visualization server/online product) so that administrators of the data visualization application can control the extent to which this capability is available to users.

Some implementations enable additional "plumbing" provided by the data visualization server so that relevant user, data, and system events are available as triggers for the Action Framework, as well as additional features such as Webhooks.

Some implementations enable generating a dashboard extension that allows users to add Action buttons to a data visualization dashboard. This is a "first-class" extension that allows the author to configure the Action to execute and supply any other design-time configuration.

Some implementations enable configuring "Flow Types" (e.g., Salesforce® flows) that are customized for a data visualization application (e.g., the Tableau application). The data visualization application (e.g., the visualization dashboard) connects to APIs in Salesforce® flows, which collect data from the visualization dashboard and perform (e.g., execute) actions according to an action template and mapped parameters.

Some implementations enable generating "blocks" that can be used in the action engine and devising methods to deploy and manage versions of them in the action engine.

Some implementations enable pre-installing quick-start workflow templates onto a data visualization application.

In some implementations, dashboard users (e.g., viewers of data visualizations and/or visualization dashboards) can use a workflow action after it has been configured by the author (e.g., by triggering a workflow action in a graphical user interface of the data visualization application).

Figure 4A:
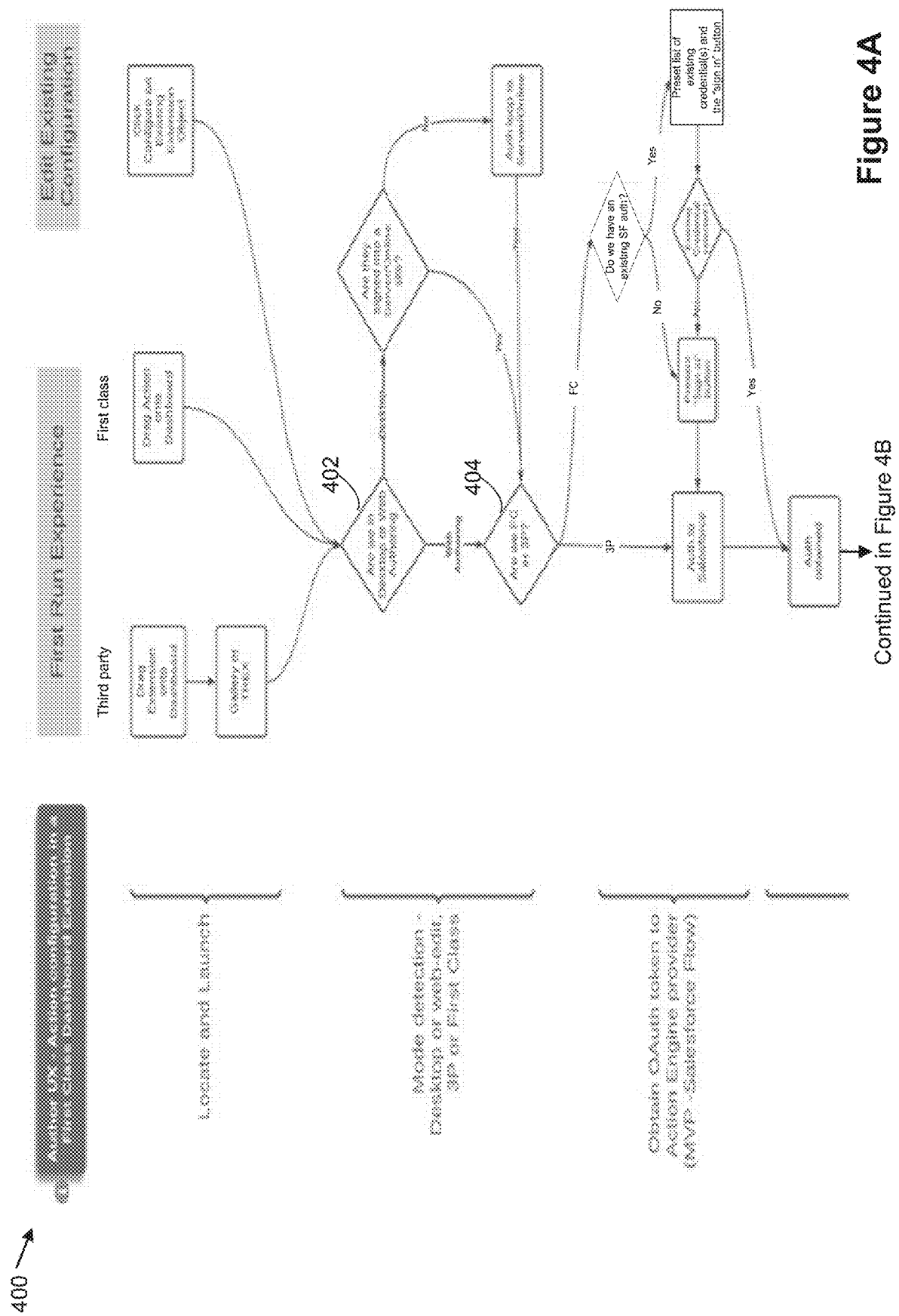
FIGS. 4A to 4C illustrate a process for configuring a workflow action according to some implementations.
Figure 4B:
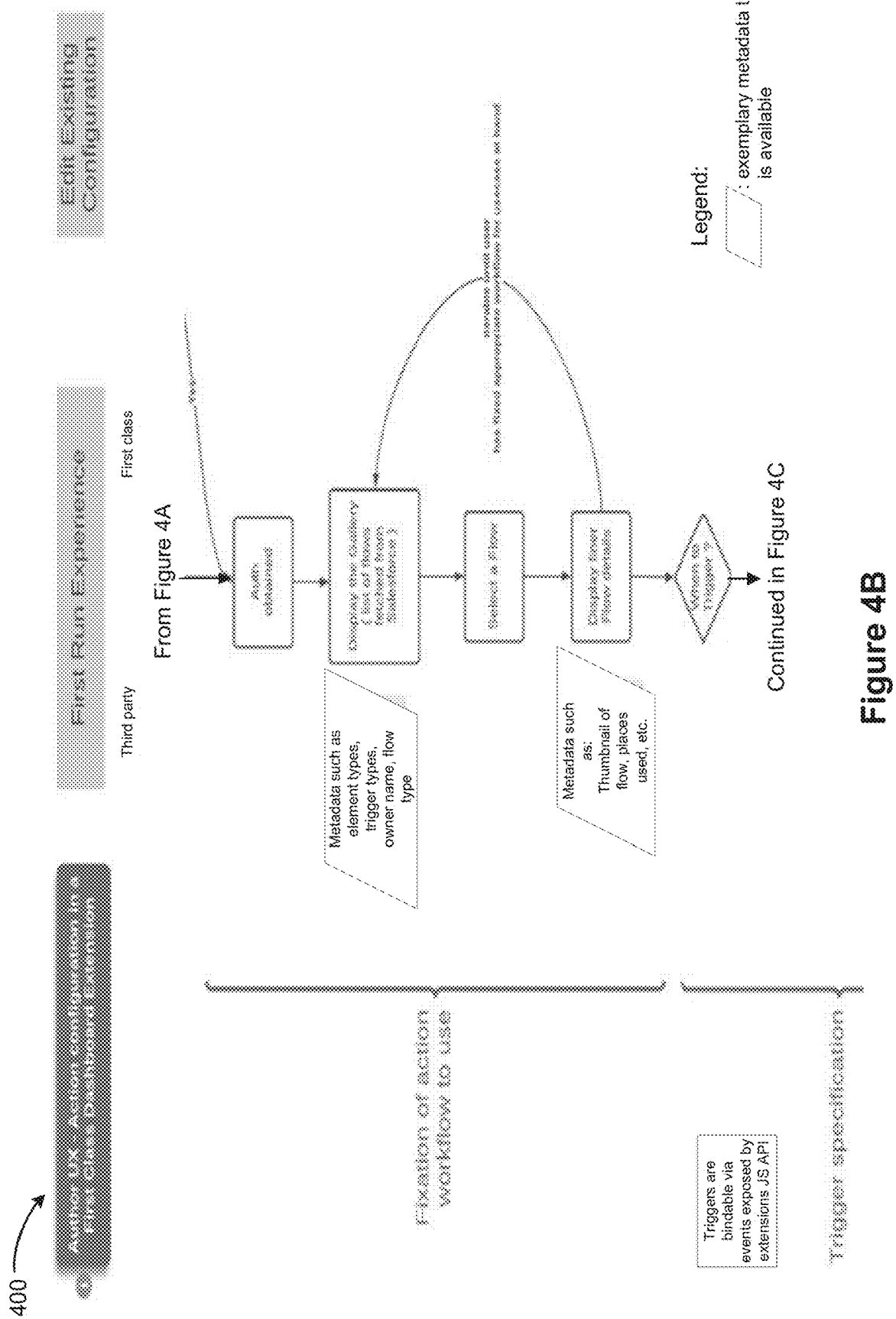
Figure 4C:
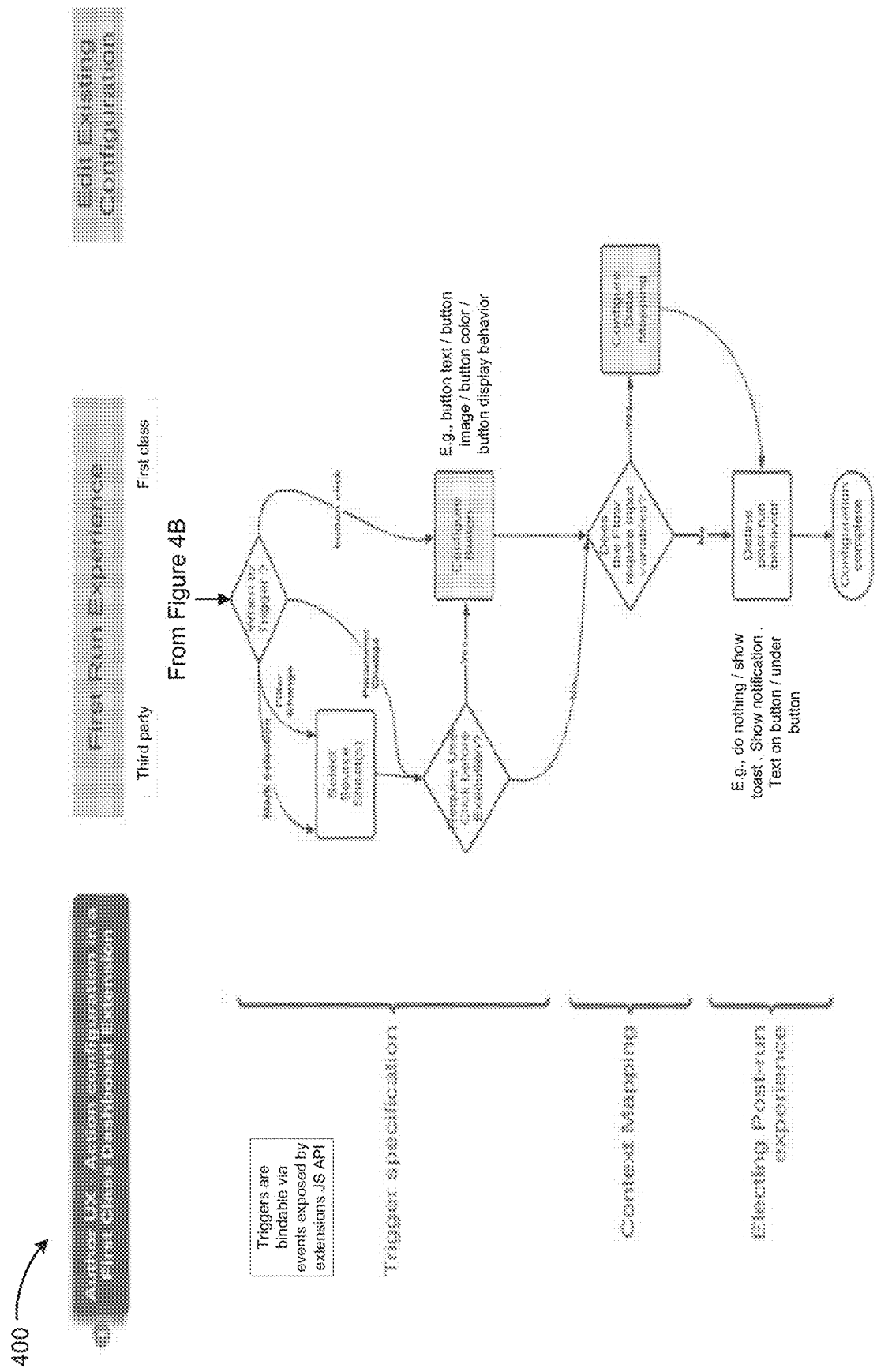

FIGS. 4A to 4C illustrate a process 400 for configuring a workflow action according to some implementations.

According to some implementations, the primary creators of workflow actions (e.g., users who configure workflow actions) are administrators or data dashboard authors (e.g., analytical authors). In some implementations, the workflow actions are configured when the data visualization application 230 (or the data visualization web application 330) is executed in an administrative mode or an author mode. In some implementations, the administrators can use the action framework to automate administrative tasks and provide governed workflows for approving and promoting content. In some implementations, the authors can use the action framework to solve a wide range of integration use cases.

In some implementations, the process for configuring a workflow action can vary depending on whether the author is using a desktop version of the data visualization application (e.g., data visualization application 230) or the web version of the data visualization application (e.g., data visualization web application 330). This is illustrated in step 402. In some implementations, the process for configuring a workflow action in the web authoring mode can vary depending on whether the author is running the data visualization web application 330 in a first class (FC) extension mode or in a third party (3P) extension mode, as illustrated in decision step 404 and the processes thereafter. As used herein, the FC extension is an extension that is served from the data visualization server 300. The 3P extension mode is an extension that is posted by a third party (e.g., an external server, external to the data visualization framework).

Figure 5A:
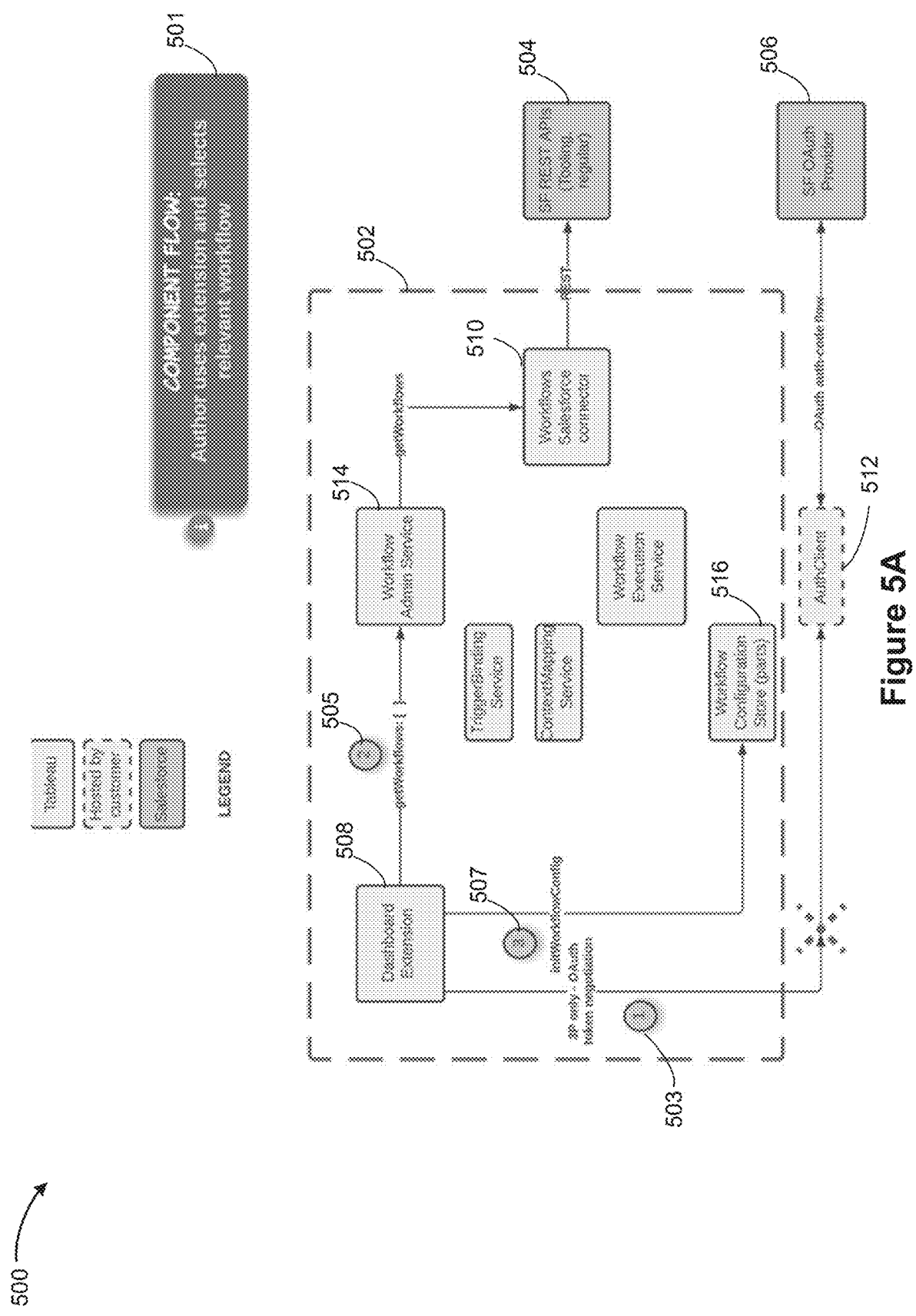
FIGS. 5A to 5C illustrate a component flow map for configuring a workflow action and triggering a Salesforce® Flow from the workflow action, in accordance with some implementations
Figure 5B:
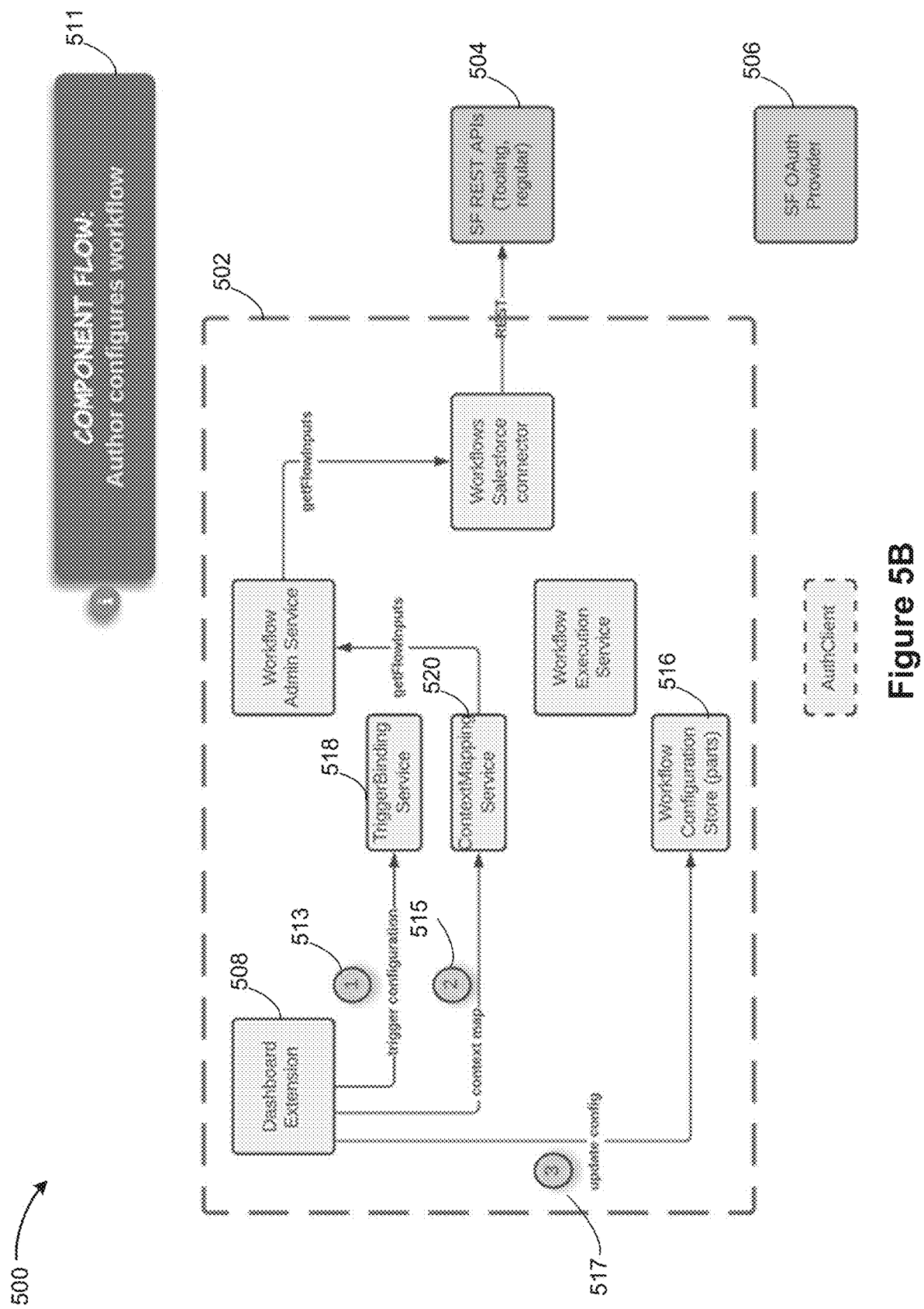
Figure 5C:
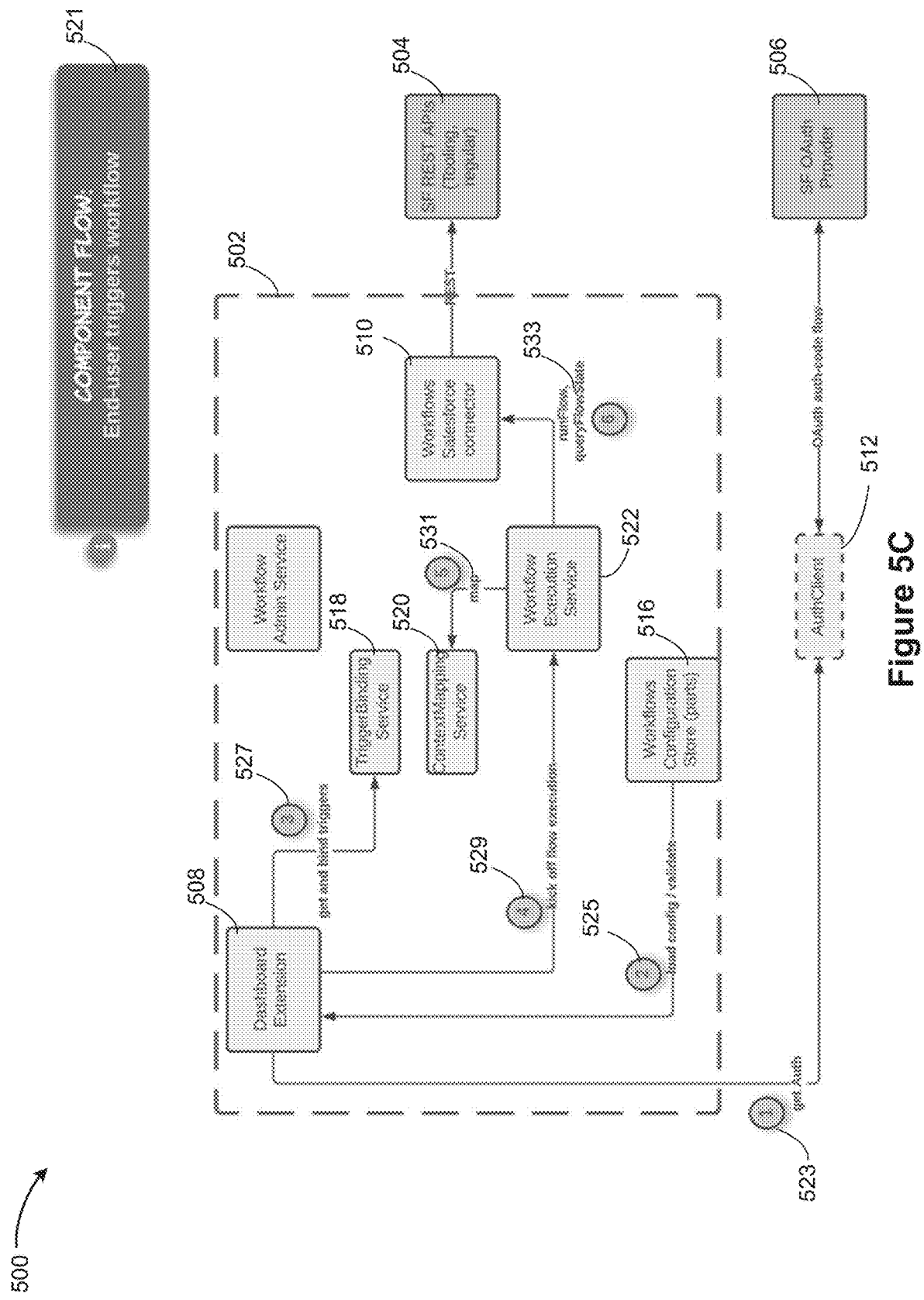

FIGS. 5A to 5C illustrate a component flow map 500 for configuring a workflow action and triggering (e.g., invoking) a Salesforce® Flow from the workflow action, in accordance with some implementations. In these figures, components that are within the boundary defined by the dashed box 502 are part of the data visualization platform (e.g., part of the data visualization server 300 and/or data visualization application 230). The components Salesforce® (SF) REST APIs 504 and SF OAuth Provider 506, which are outside the boundary defined by the box 502, are external to the data visualization platform.

FIG. 5A illustrates a component flow map when an author (e.g., a dashboard author or a workflow author) uses (501) a dashboard extension 508 and selects a relevant workflow.

In some implementations, if the data visualization application is running in the third party (3P) extension mode, the data visualization server 300 sends (503) an authentication request to authenticate (512) a client.

In some implementations, the dashboard extension 508 obtains (505) workflows from a Workflows Salesforce Connector 510 (e.g., an action engine) via a workflow admin service 514. After a workflow is selected, it is configured (507) via a workflow configuration store 516.

FIG. 5B illustrates a component flow map when a dashboard author configures (511) a workflow. In some implementations, configuring a workflow includes configuring a trigger (513) via trigger binding service 518. Examples of triggers (e.g., trigger actions or actions that will trigger/initiate a workflow) include user selection of a data point, detection of a filter change by a computing device, or detection of a parameter change by a computing device. This is also discussed in FIG. 8D.

FIG. 5B illustrates that, in some implementations, configuring a workflow includes mapping (515) data (e.g., context) from the data visualizations to inputs of the workflow via context mapping service 520. In some implementations, the context mapping service 520 filters data in the data visualizations to a subset of data with data types that are compatible with the workflow inputs. For example, if an workflow input can only take Boolean values (e.g., "0" or "1"), the context mapping service 520 filters the data in the data visualizations, such that only data columns of the data visualizations that correspond to integer values or that can be marked as Boolean are presented to an author.

FIG. 5B illustrates that, in some implementations, the dashboard extension 508 updates (517) configurations that are stored in the workflow configuration store 516.

FIG. 5C illustrates triggering (521) of a workflow by an end-user according to some implementations. In some implementations, when a data visualization application is initialized on a computing device associated with the end-user, the dashboard extension 508 connects (523) to the SF OAuth Provider 506. In some implementations, the dashboard extension 508 loads or validates (525) configurations in the workflow configuration store 516. In some implementations, the dashboard extension 508 obtains (527) triggers from the trigger binding service 518.

In some implementations, during runtime, an end user can trigger a workflow by selecting data and/or a predefined user interface element (e.g., an icon or a workflow button) on a data visualization dashboard (e.g., in the user interface 100 or on a data visualization dashboard 802). In some implementations, user selection of the data and/or the interface element initiates (529) execution of the workflow. In some implementations, a workflow execution service 522 maps (531) data (e.g., a data point that the user has selected or parameters of an action template) from the data visualization dashboard to the context mapping service 520. In some implementations, the workflow execution service 522 maps the data to a workflow template. The workflow execution service 522 transmits (533) the mapped parameters (and/or the action template) through the workflow Salesforce® connector 510. The workflow Salesforce® connector 510 initiates execution of an external service (e.g., a Salesforce® flow) by calling one or more API functions via SF REST APIs 504 (e.g., Salesforce® REST APIs).

Figure 6:
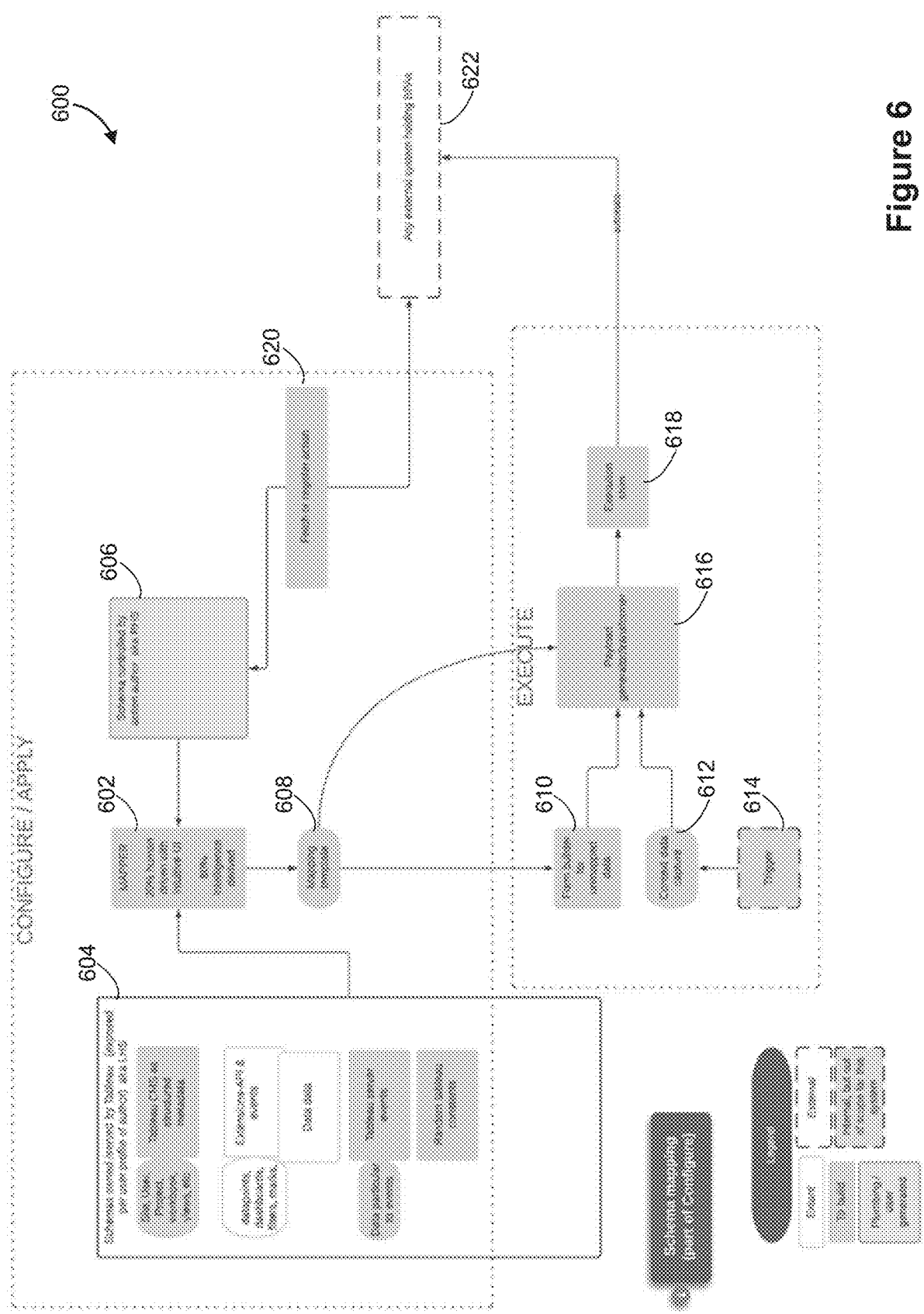
FIG. 6 illustrates a process for configuring and executing a workflow action according to some implementations.

FIG. 6 illustrates a process 600 for configuring and executing a workflow action according to some implementations. In some implementations, the process 600 is performed by a computing device executing a data visualization application.

FIG. 6 illustrates that, in some implementations, in the configuration/apply stage, a mapper 602 maps schemas 604 owned or served by a data visualization application 230 to a schema 606 (e.g., a Salesforce® flow or an external service) to create a workflow action. In some implementations, the schemas 604 include domains of each data element that the data visualization application 230 (or the data visualization server 300) can expose as triggers for the workflow action. In some implementations, as illustrated in FIG. 6, the schemas 604 include datapoints, dashboards, filters, marks, data, extensions (e.g., APIs and events), site, user, workbook, views, Tableau server events, random Tableau constants, and Tableau content management service (CMS) as structured metadata. In some implementations, the schemas 606 fetch or register (620) actions from an external system holding one or more business process automation applications 622.

In some implementations, the mapper 602 maps attributes (e.g., data elements, data fields, data values, and data marks) of the schemas 604 to respective parameters of one or more mapping templates 608 (e.g., predefined action templates). The mapping template 608 specifies the inputs (from the data visualization application and/or the data dashboard) that are needed for the action. In some implementations, the computing device uses the mapping templates to form a builder for unmapped data (610) in the execution stage.

In some implementations, the mapping is performed automatically (e.g., by a computing device) using a semantic model of the data source.

In some implementations, the mapping is performed semi-automatically (e.g., using a combination of machine and human action).

FIG. 6 illustrates that, in some implementations, in the execution stage, the computing device captures (612) context data in response to receiving a trigger 614 for the workflow action. In some implementations, the unmapped data 610, the context data 612, and the mapping template 608 are sent to a payload generator/transformer 616. The payload generator/transformer 616 utilizes an execution shim 618 to transmit the payload to the external system 622.

Figure 7:
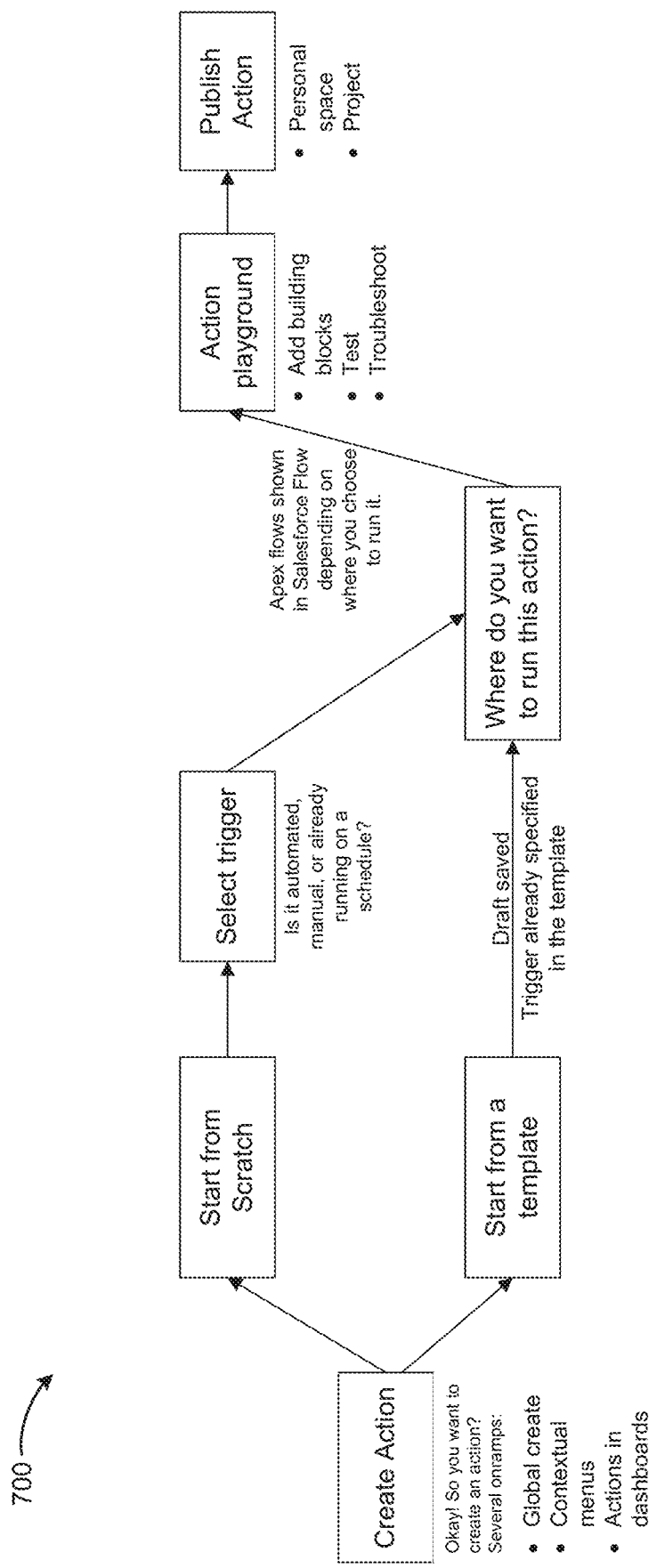
FIG. 7 illustrates an exemplary process for creating a workflow action according to some implementations.

FIG. 7 illustrates a flowchart 700 for creating a workflow action according to some implementations.

Figure 8A:
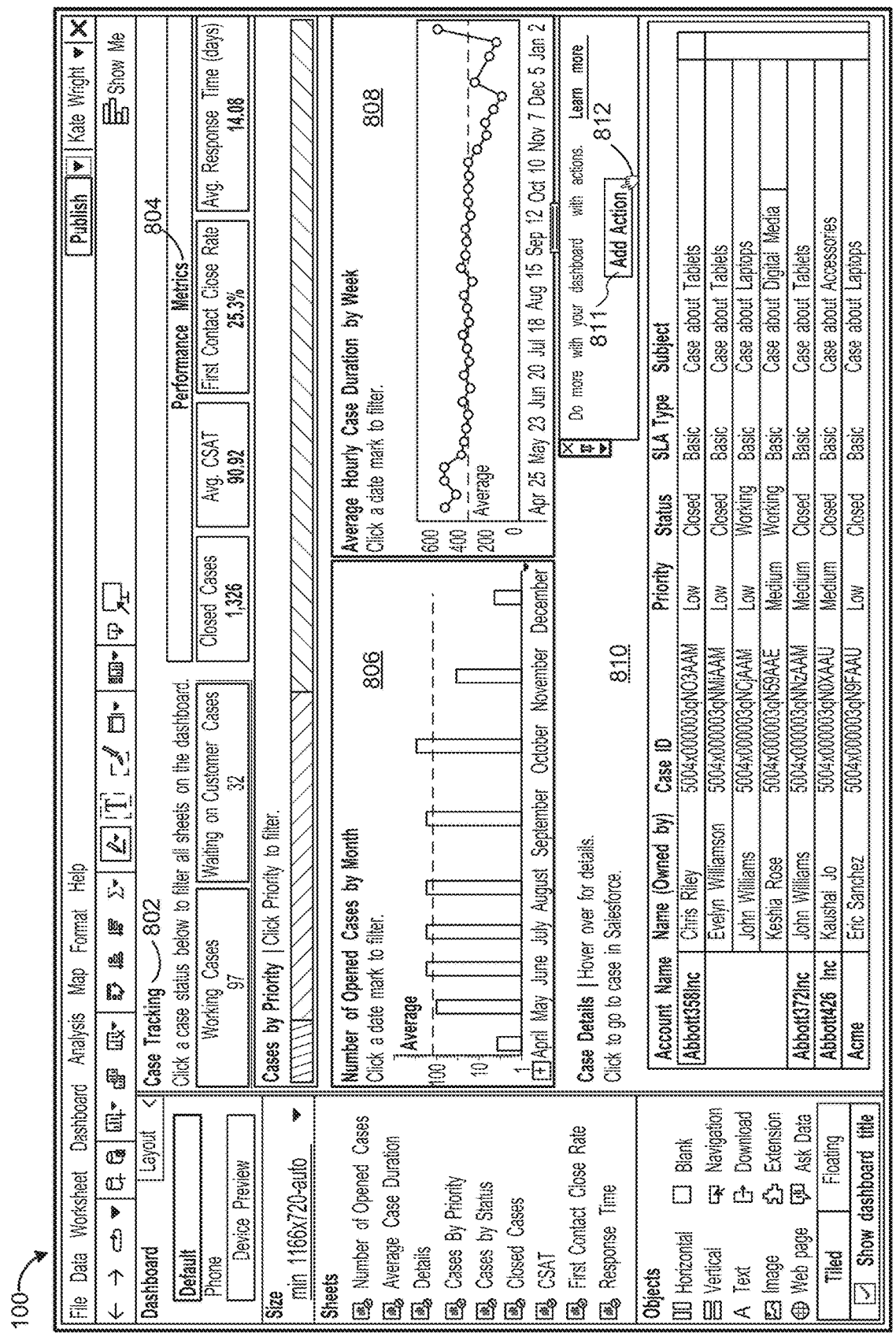
FIGS. 8A-8P provide a series of screen shots for interactions with a graphical user interface according to some implementations.

FIGS. 8A-8P provide a series of screen shots for interactions with a graphical user interface according to some implementations.

FIG. 8A illustrates the graphical user interface 100 displaying a data dashboard 802 (e.g., data visualization dashboard) for "Case Tracking." In some implementations, the data dashboard 802 displays data that is captured in real time. In some implementations, a data dashboard includes one or more data visualizations related to a data source 258. In the example of FIG. 8A, the data dashboard 802 includes a first data visualization 804 (e.g., a data table) for "Performance Metrics," a second data visualization 806 (e.g., a bar chart) for "Number of Opened Cases by Month," a third data visualization 808 (e.g., a line graph) for "Average Hourly Case Duration by Week," and a fourth data visualization 810 (e.g., a data table) for "Case Details." Details of generating data dashboards are provided in U.S. patent application Ser. No. 17/357,912, filed Jun. 24, 2021, entitled "Using a Natural Language Interface to Generate Dashboards Corresponding to Selected Data Sources" and U.S. patent application Ser. No. 17/473,992, filed Sep. 13, 2021, entitled "Using a Natural Language Interface to Correlate User Intent with Predefined Data Analysis Templates for Selected Data Sources," each of which is incorporated by reference herein in its entirety.

In some implementations, the data visualization application 230 in FIG. 8A corresponds to an "author" (e.g., authoring) mode in which an author of the dashboard can configure one or more workflow actions. FIG. 8A shows that the data dashboard 802 includes an interactive element 811 (e.g., an affordance or a button) that, when selected by a user (e.g., a dashboard author or a workflow author), enables a workflow action to be configured. In FIG. 8A, a user selects (812) the interactive element 811.

Figure 8B:
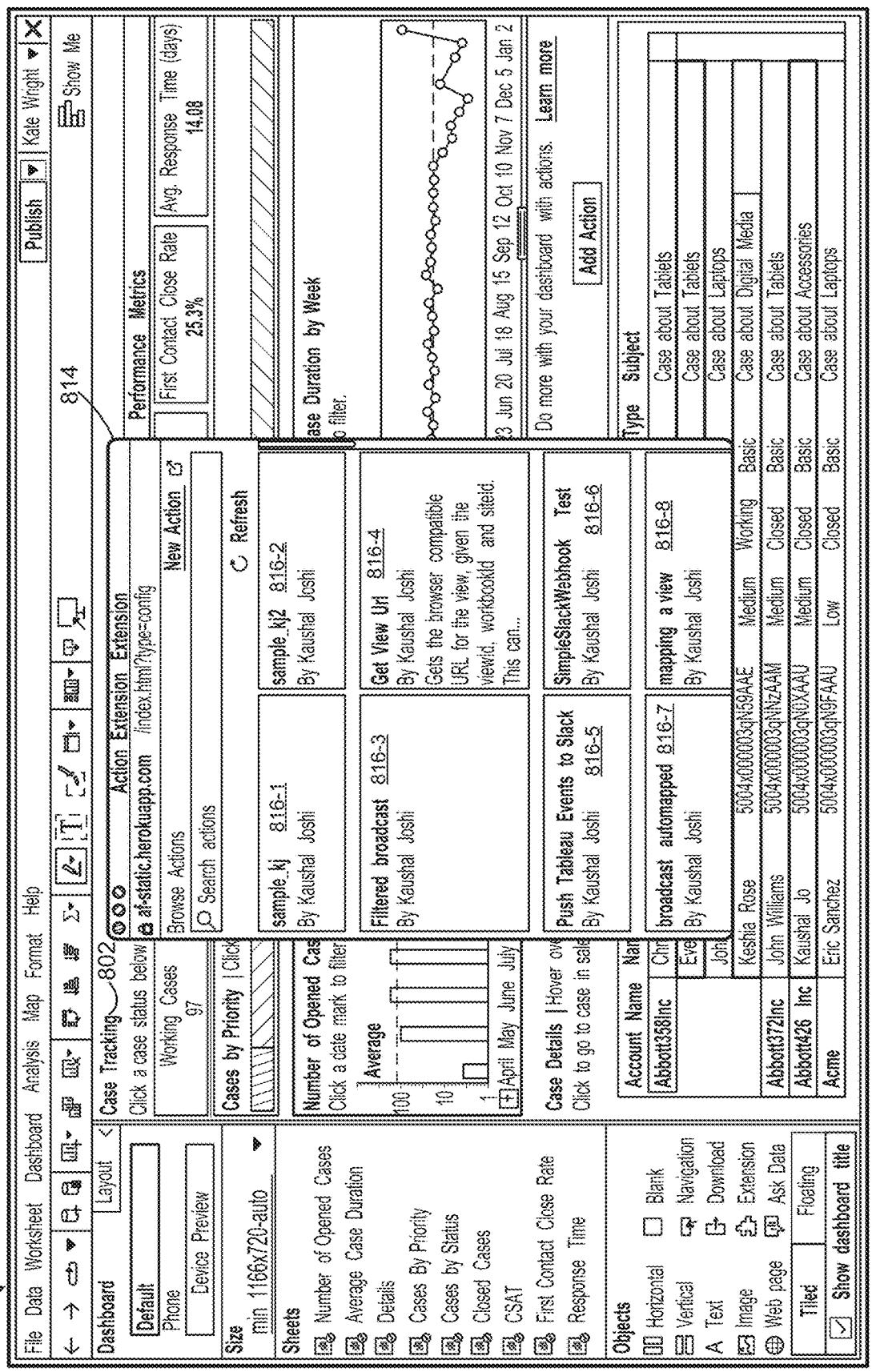

FIG. 8B illustrates that, in response to user selection of the interactive element 811 (e.g., the "Add Action" button), the graphical user interface 100 displays a window 814, which includes a list of (e.g., predefined) workflows 816 (e.g., workflow actions 816-1, 816-2, . . . , 816-8). In some implementations, each of the workflows 816 is stored at the computing device 200 or on the data visualization server 300.

In some implementations, each of the workflows 816 includes a predefined action template, which specifies the parameters that are needed for the workflow action. In some implementations, each of the workflows 816 is associated with a respective external service (e.g., a third-party application distinct from the data visualization application 230)

Figure 8C:
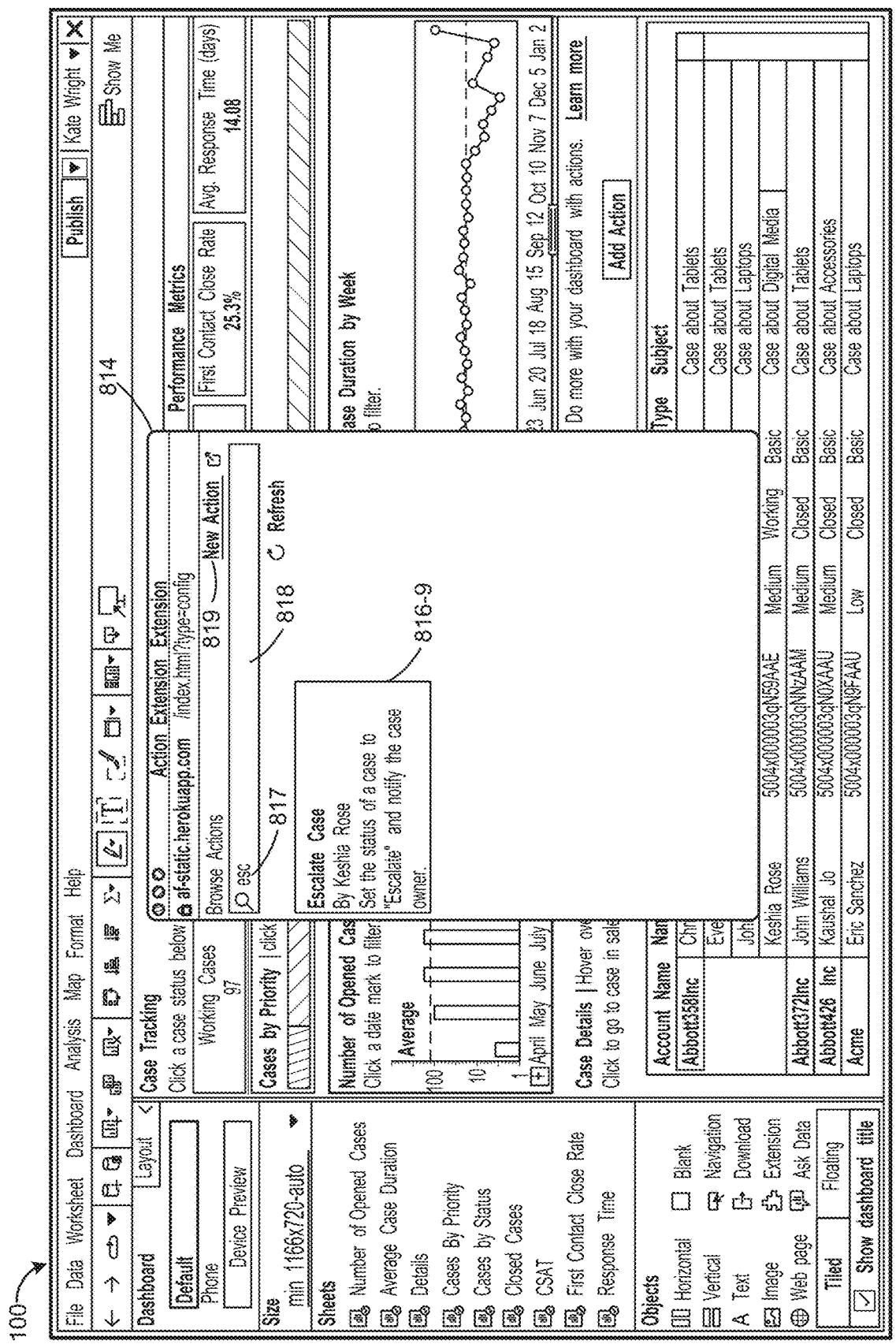

In the example of FIG. 8B, the user would like to use a workflow for "Escalating" a case. FIG. 8C illustrates the user inputting the letters "esc" 817 into the search box 818. FIG. 8C illustrates that, in response to the user input, the window 814 displays a workflow 816-9 (e.g., workflow action) for "Escalate Case." In some implementations, instead of configuring an existing workflow action, the dashboard author can create a new action (e.g., by selection of a "New Action" affordance 819).

Figure 8D:
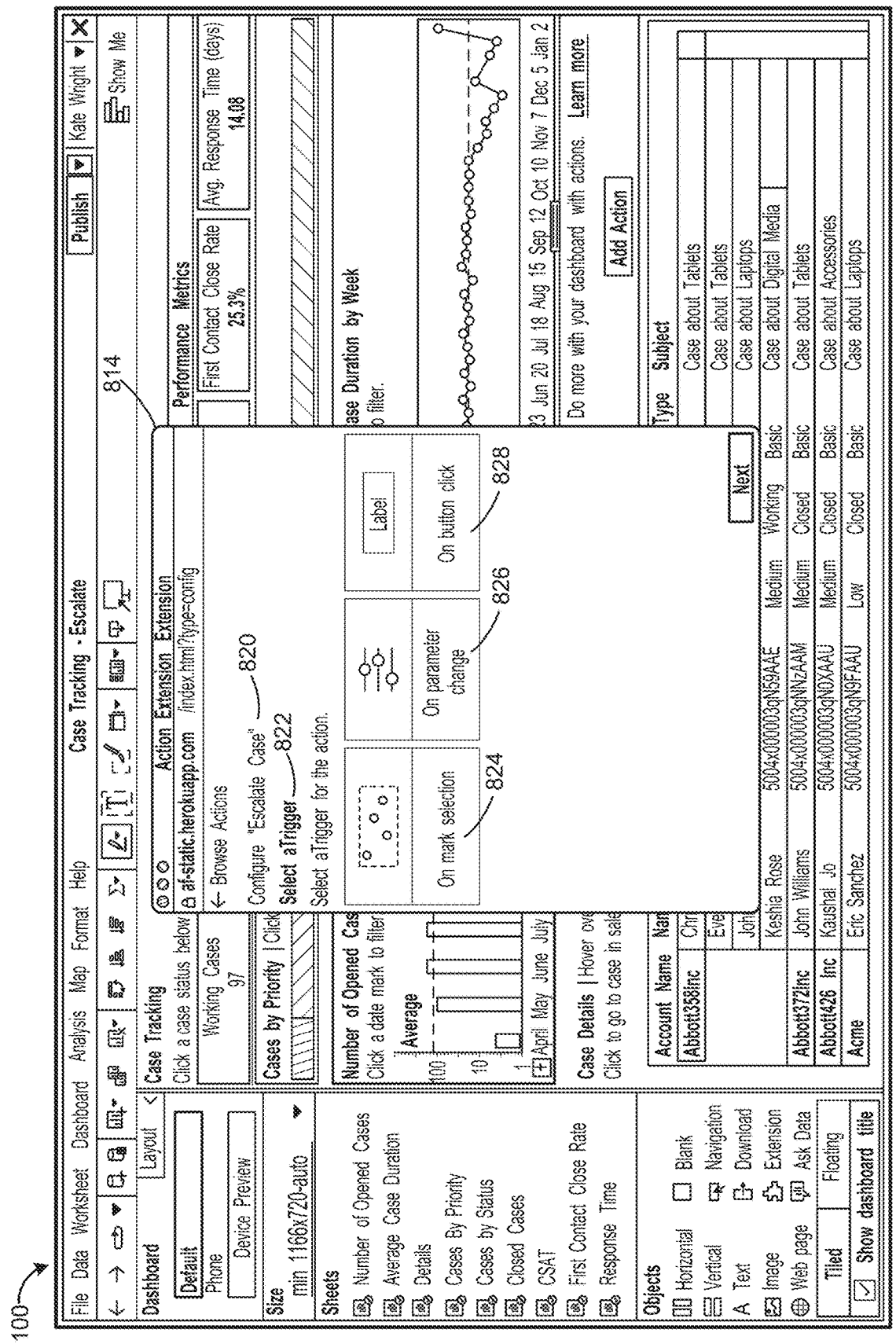

In some implementations, configuring a workflow includes selecting (822) a trigger for the workflow action. FIG. 8D illustrates the triggers can be based on mark selection 824, parameter change 826, or button click 828.

As an example of trigger based on parameter change (element 826), suppose that a dashboard author wants to offer a set of feedback actions to the end users. The dashboard author can select the "parameter change" option 826 in the graphical user interface, which enables the author to populate (e.g., configure) a menu (e.g., drop down menu) with values of parameters. For example, the author can specify values (e.g., options) such as "Provide feedback," "Create a ticket," "Request help via Slack," and "Send an email" in the drop down menu. In some implementations, the default value of the parameter can be the top value ("Provide feedback."). At runtime, selection of any of the values (e.g., options) by an end user will trigger the workflow (e.g., immediately) and pass in the parameter value. The receiving workflow can then, based on the supplied user context, create a Slack® thread with the end user, open an email conversation with the end user, or log a ticket in Service Cloud for the end user.

FIG. 8D illustrates that the trigger for a workflow action can be based on a button click (element 828). In some implementations, in accordance with user selection of the button click option 828, the data visualization application 230 provides the dashboard author with a button (e.g., an interactive element), which includes arbitrary text and formatting provided at design-time. The dashboard author can configure the text, color, label, and other characteristics of the button. For example, the text of the button can be configured to be "Open a ticket," "Escalate," or "Merge this data." At run-time, depending on the configuration, an end user is presented with the button either immediately or on selecting one or more data marks from a data dashboard.

Figure 8E:
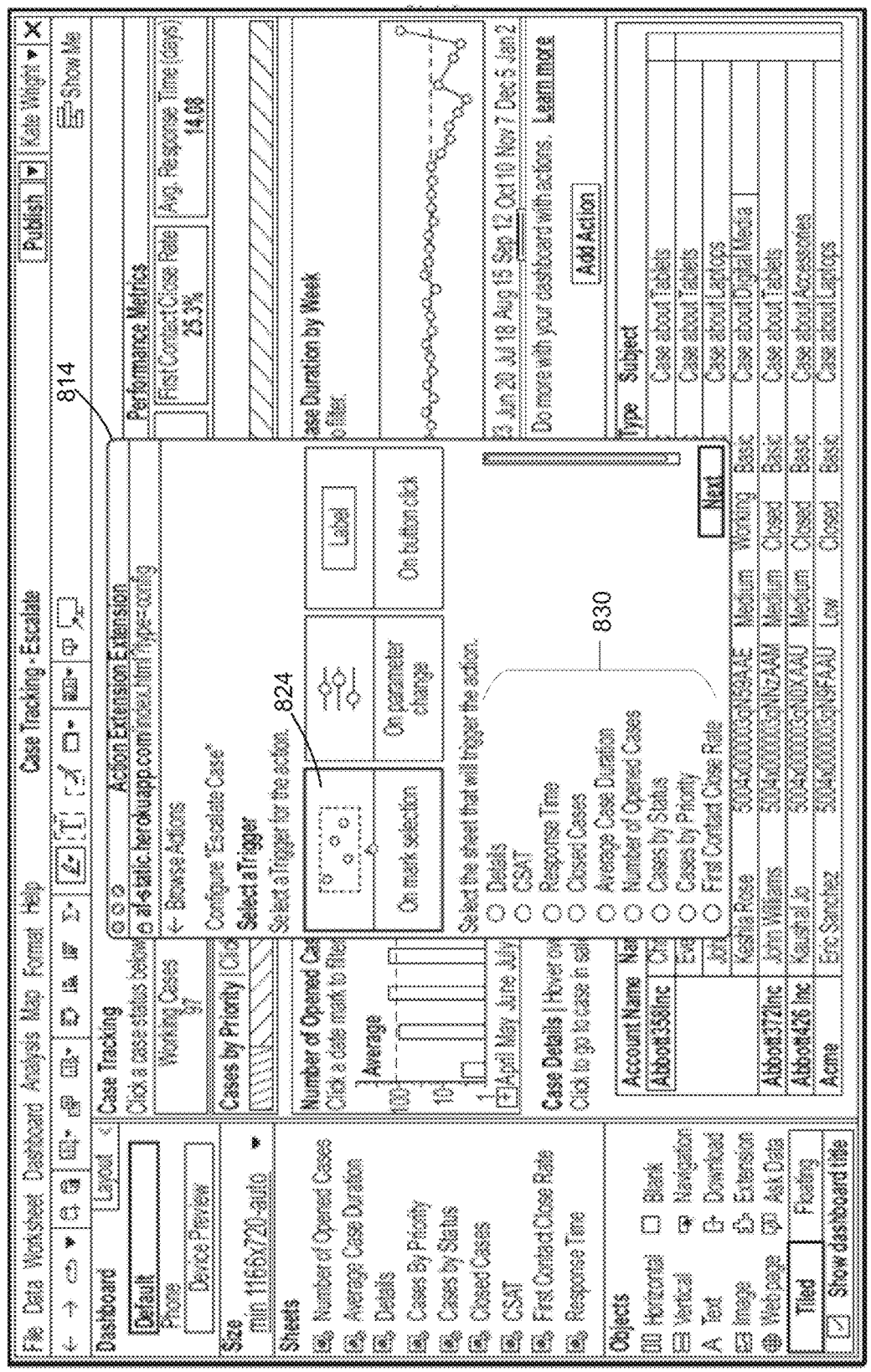

With continued reference to FIG. 8E, in this example, in response to user selection of the "On mark selection" option 824, the graphical user interface 100 displays a list of sheets 830 (e.g., worksheets or data visualizations).

Figure 8F:
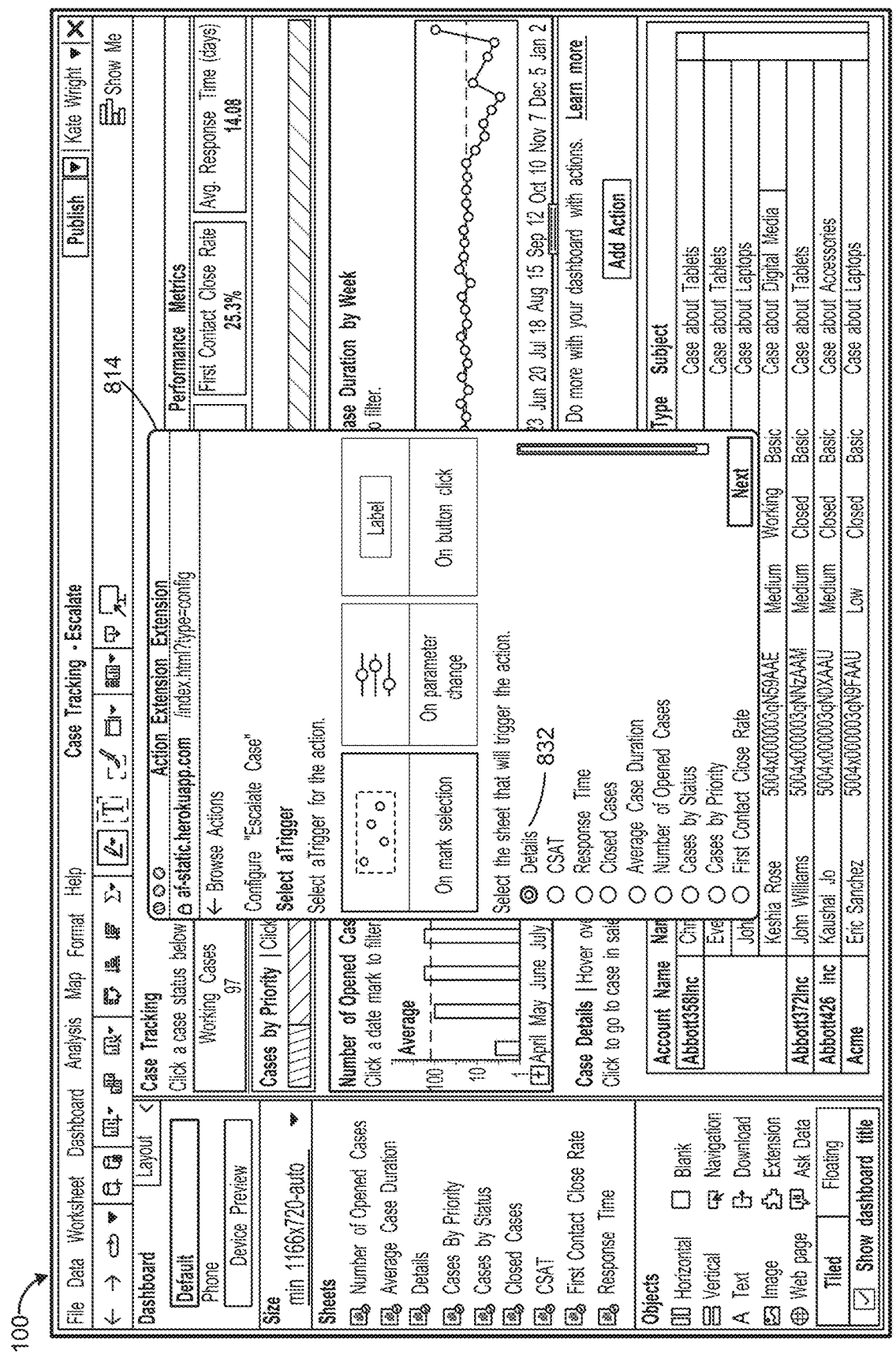

FIG. 8F illustrates user selection (832) of the "Details" sheet (e.g., corresponding to the data visualization 810 for "Case Details").

Figure 8G:
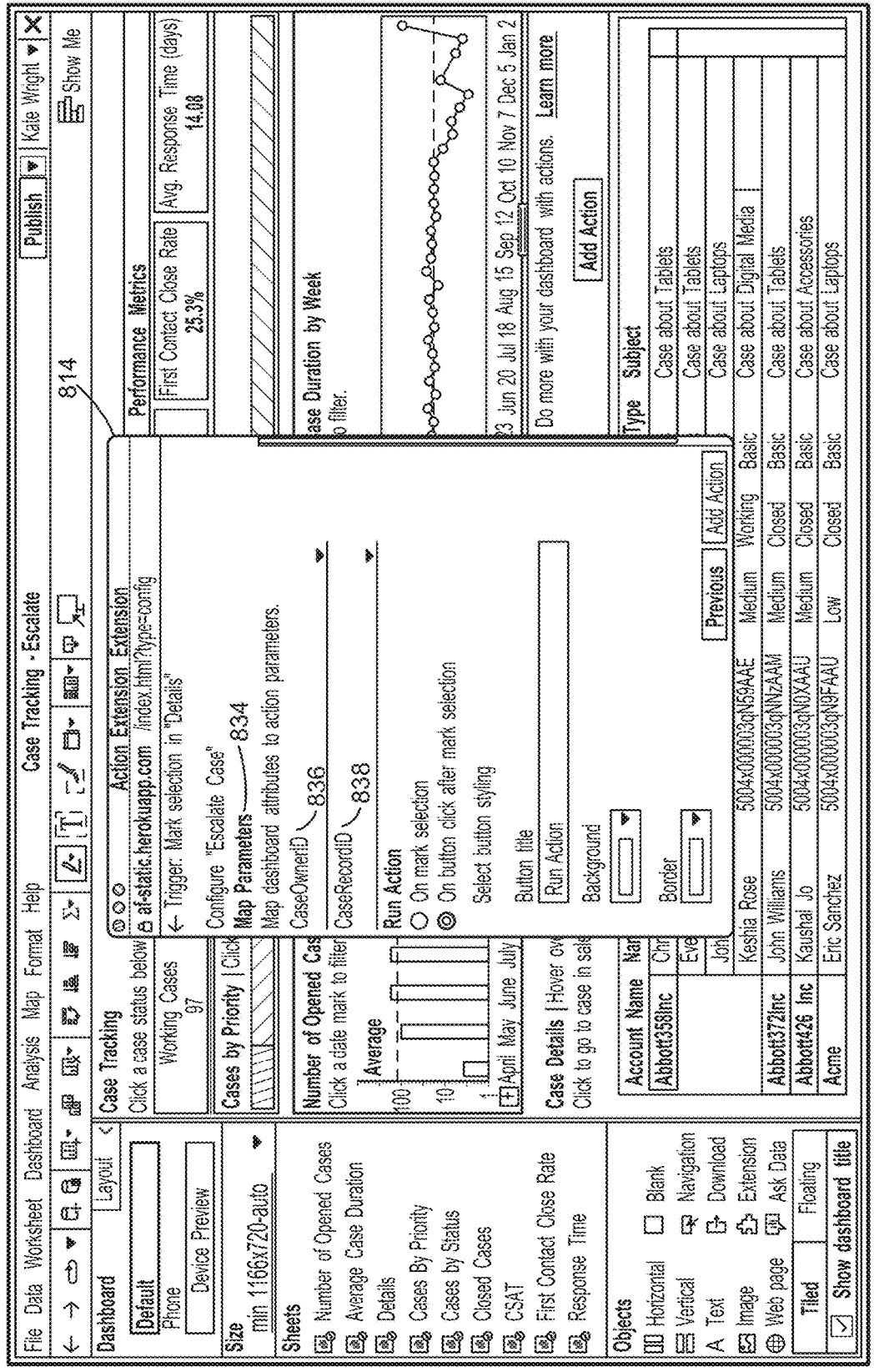

FIG. 8G illustrates the parameter mapping (834) process according to some implementations. In this step, the data visualization application 230 maps attributes (e.g., data elements, data fields, data values, or data marks) of the data dashboard to parameters of an action template corresponding to the workflow action. In this example, the template for the "Escalate Case" workflow action includes the parameters "case owner ID" 836 and "case ID" 838.

Figure 8H:
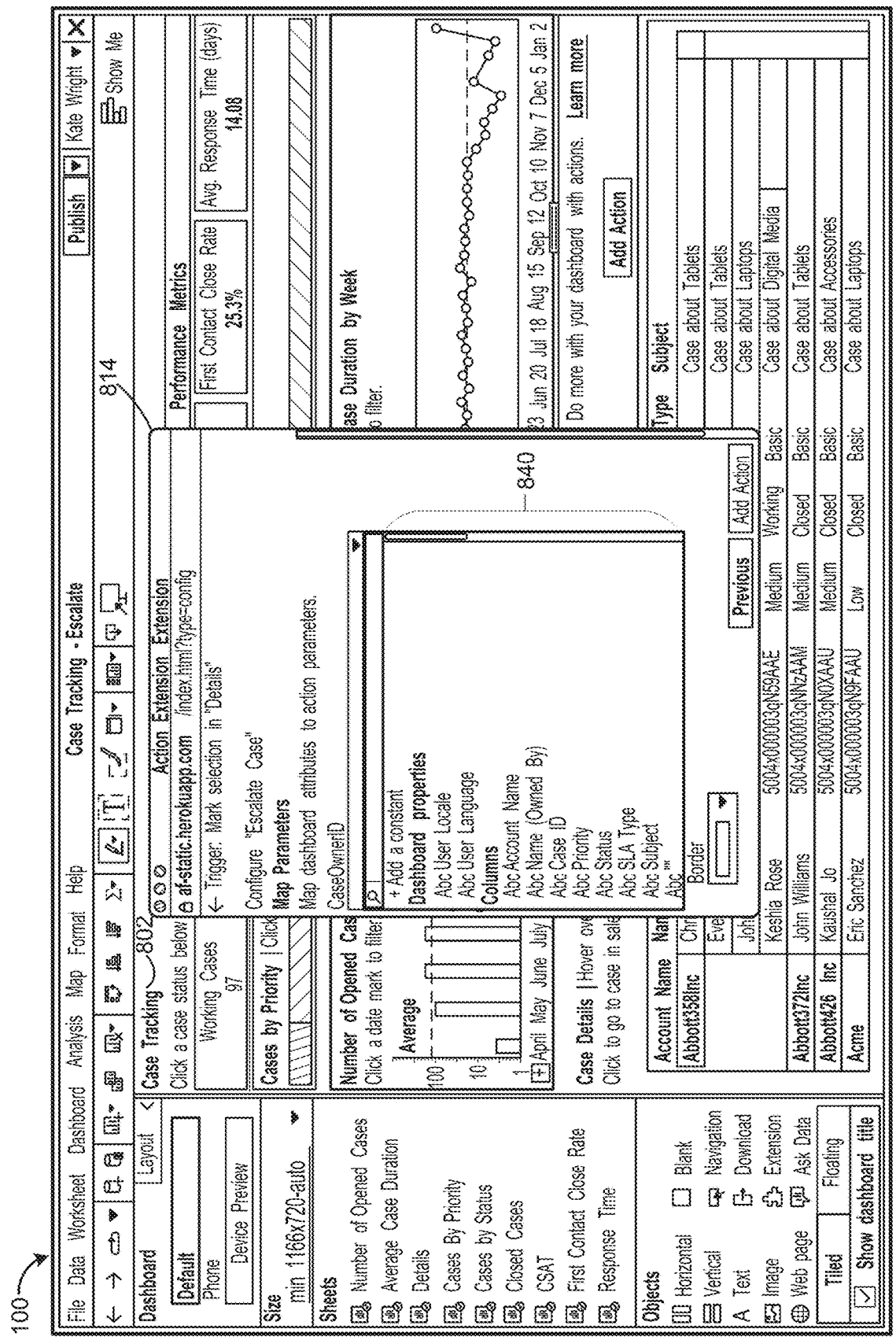
Figure 8I:
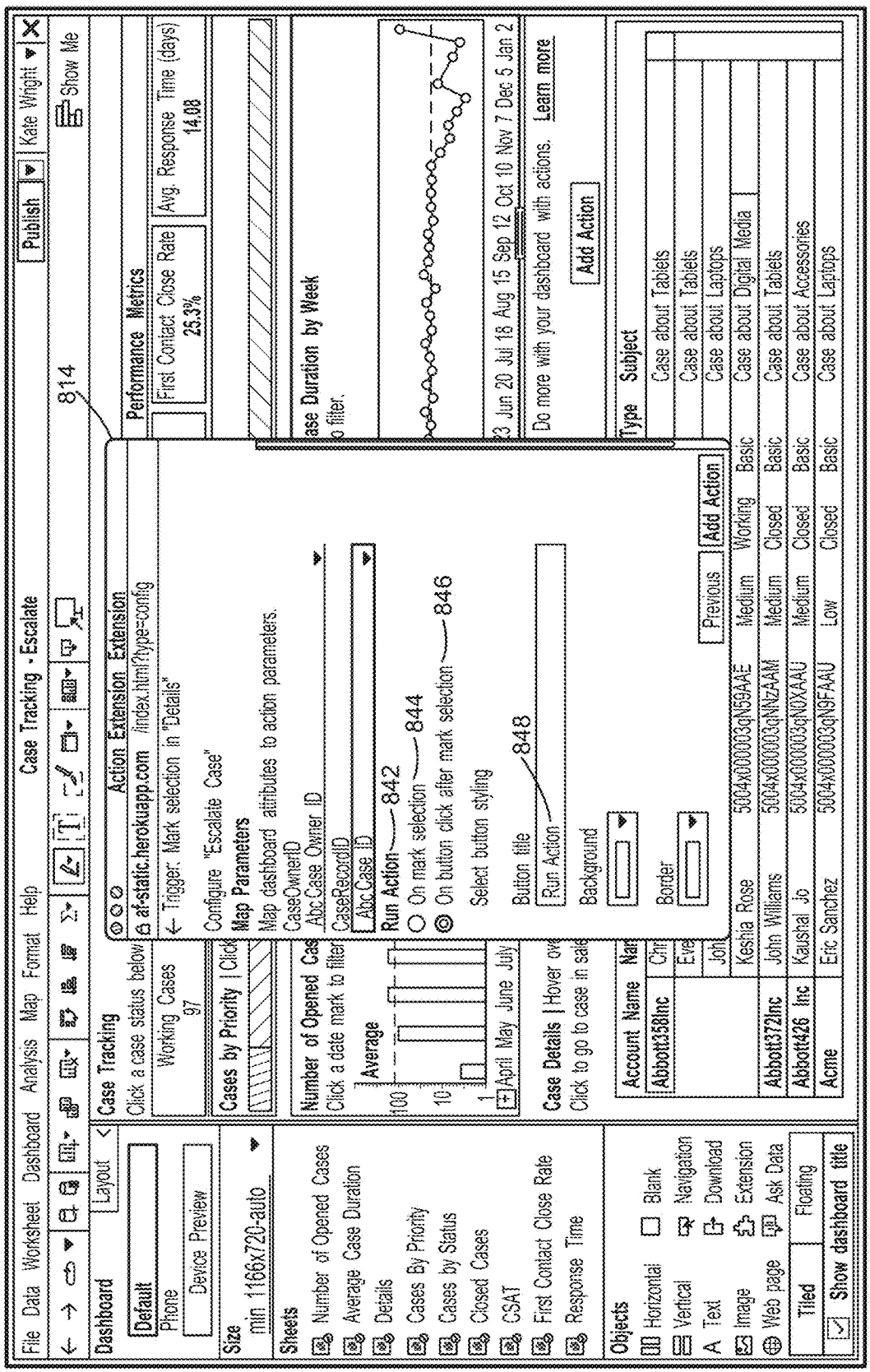

FIG. 8H illustrates user selection of respective attributes (e.g., data fields) of the data dashboard 802 (e.g., from a dropdown menu 840) to map to parameters of the "Escalate Case" workflow action template. FIG. 8I illustrates configuring when to run (e.g., cause initiation of or cause execution of) the workflow action 842. For example, the dashboard author can configure the workflow action to be run on selection (844) of a data mark, or on a button click (846) after selection of a data mark.

Figure 8J:
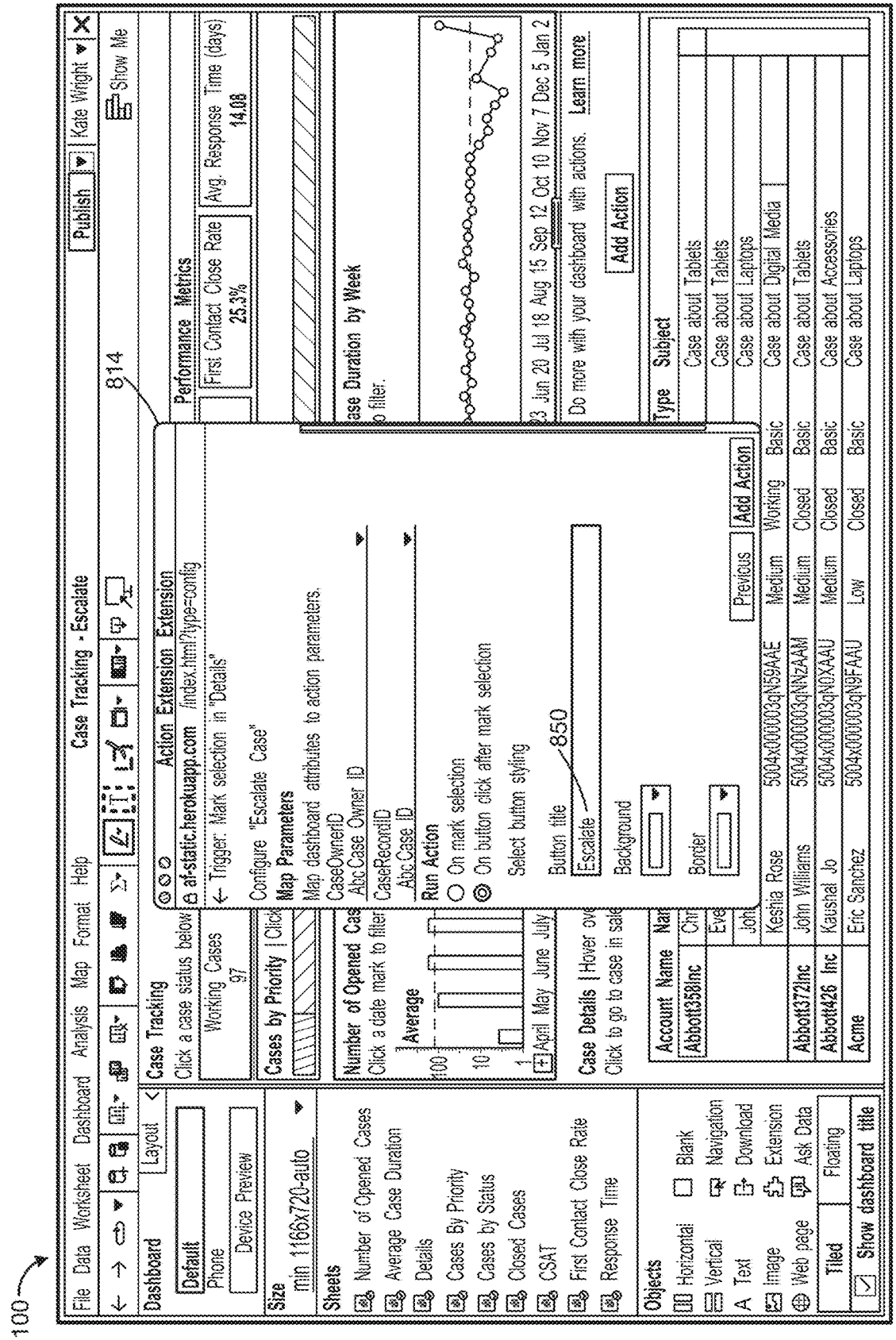

FIG. 8J illustrates renaming of the button title from Run Action (element 848 in FIG. 8I) to "Escalate" (element 850 in FIG. 8J).

Figure 8K:
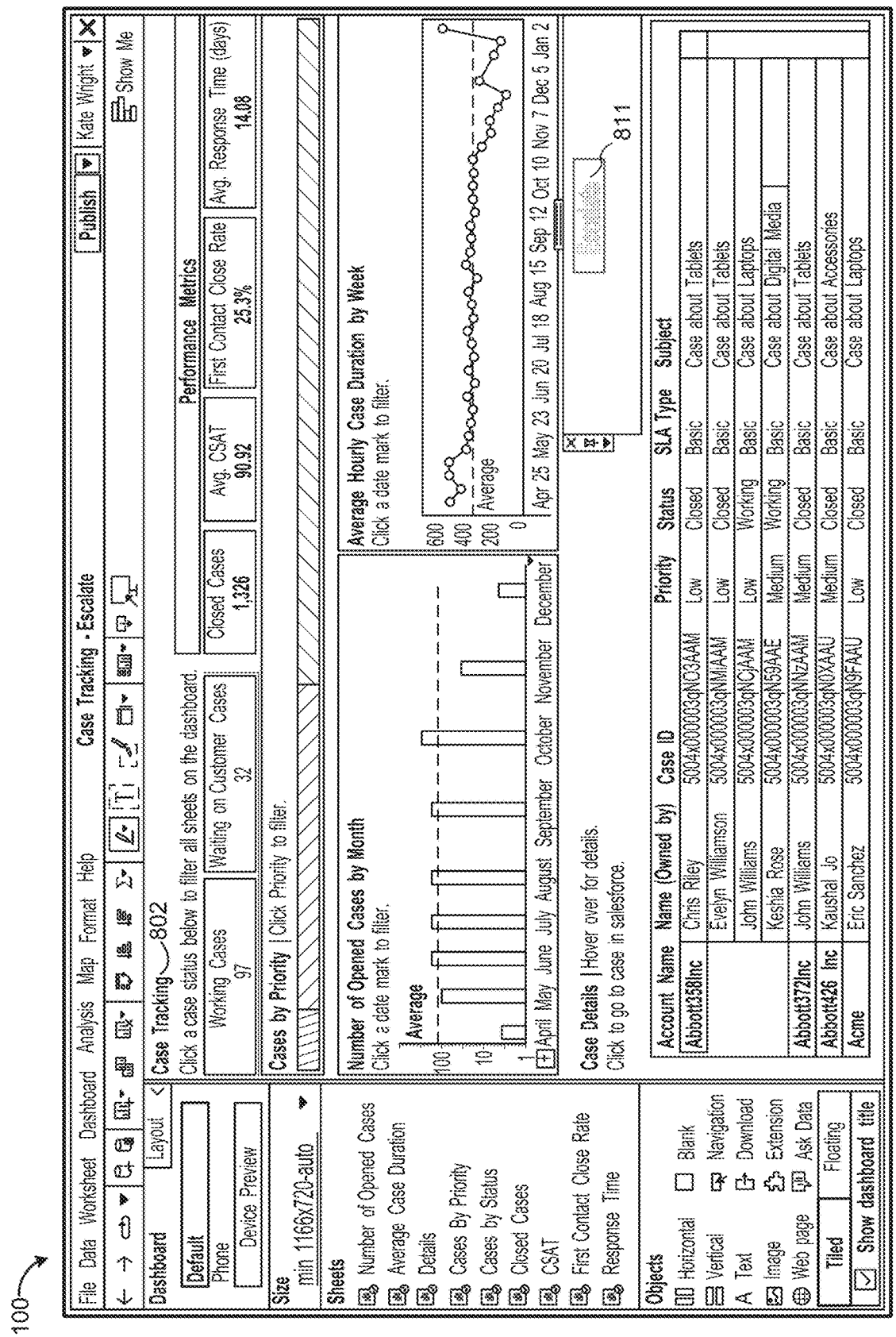

FIG. 8K illustrates the data dashboard 802 after the "Escalate Case" workflow action has been configured by the dashboard author. In this example, the interactive element 811 is renamed from "Add Action" (see, e.g., FIGS. 8A and 8J) to "Escalate."

Figure 8L:
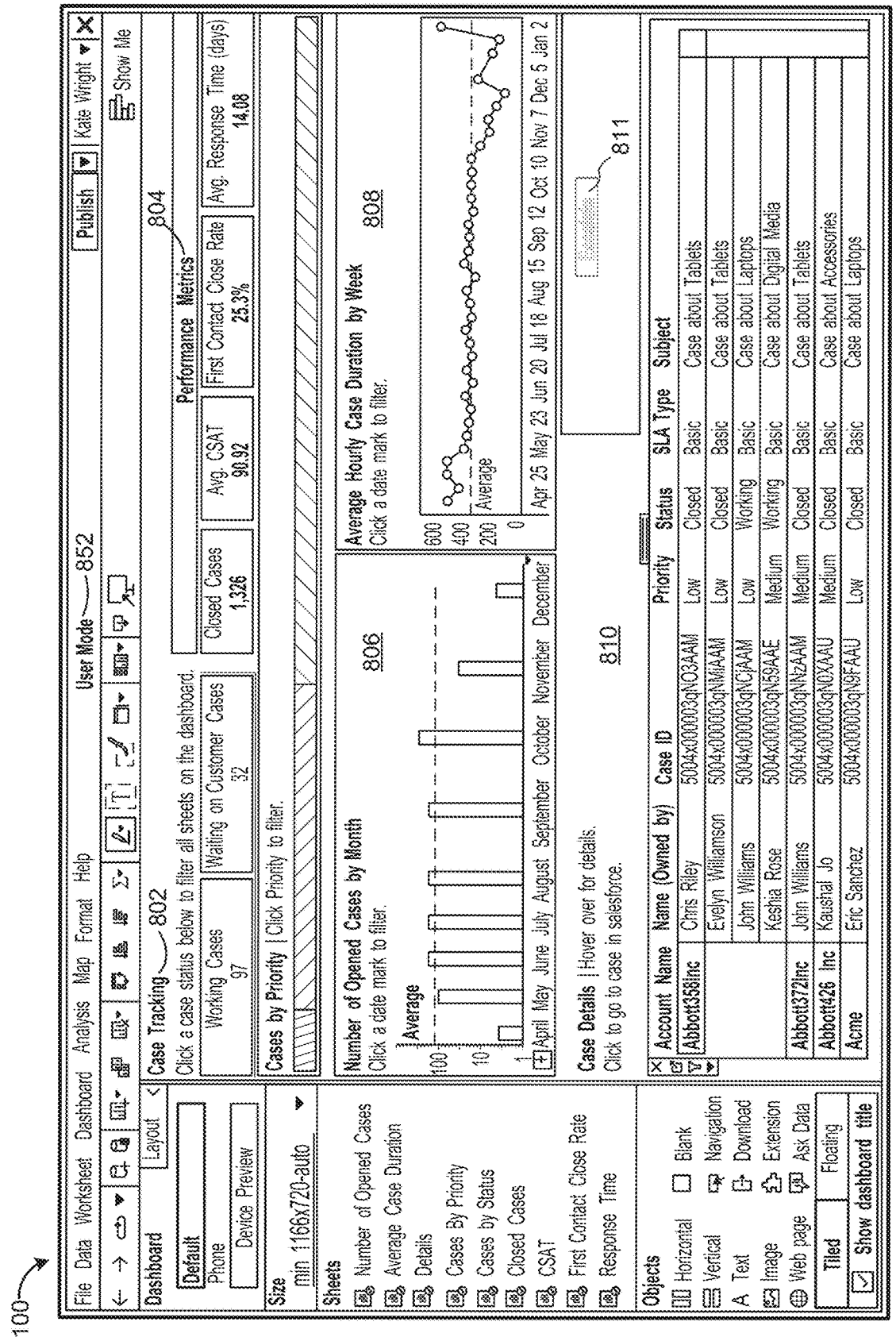

FIG. 8L illustrates the data dashboard 802 in a user mode 852 (e.g., consumer mode). In some implementations, in the user mode 852, an end user can interact with a data dashboard in accordance with configurations defined by an author of the dashboard. In the example of FIG. 8L, an end user can view the data visualizations 804, 806, 808, and 810. An end user can also trigger an "Escalate Case" workflow by selecting a data mark and clicking on the "Escalate" interactive element 811 (consistent with the workflow configuration discussed in FIGS. 8C to 8J). FIG. 8L illustrates the interactive element 811 ("Escalate") is grayed out because the data visualization application has not detected selection of a data mark in the "Details" sheet (e.g., the data visualization 810) that would enable triggering the "Escalate Case" workflow action.

Figure 8M:
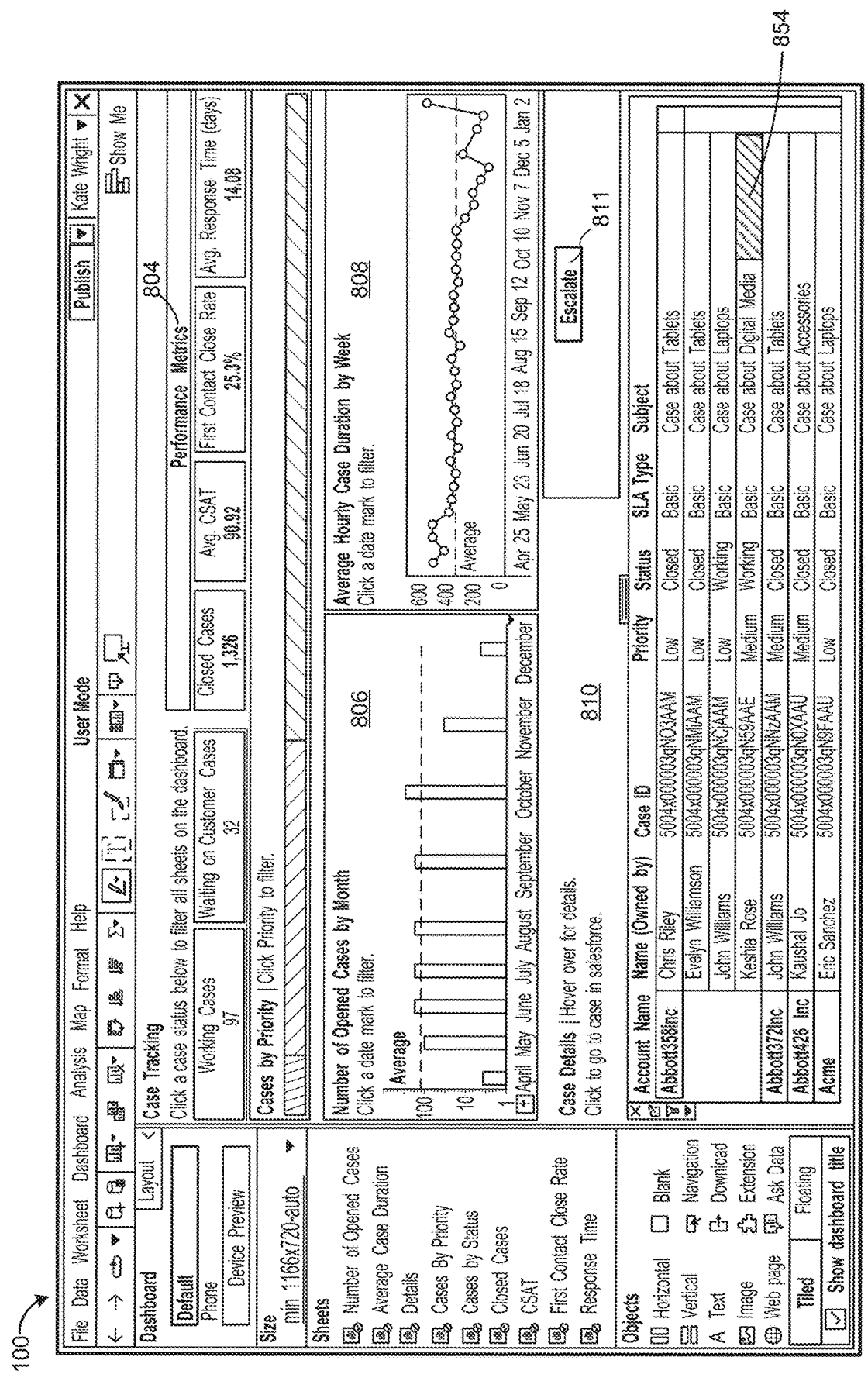
Figure 8N:
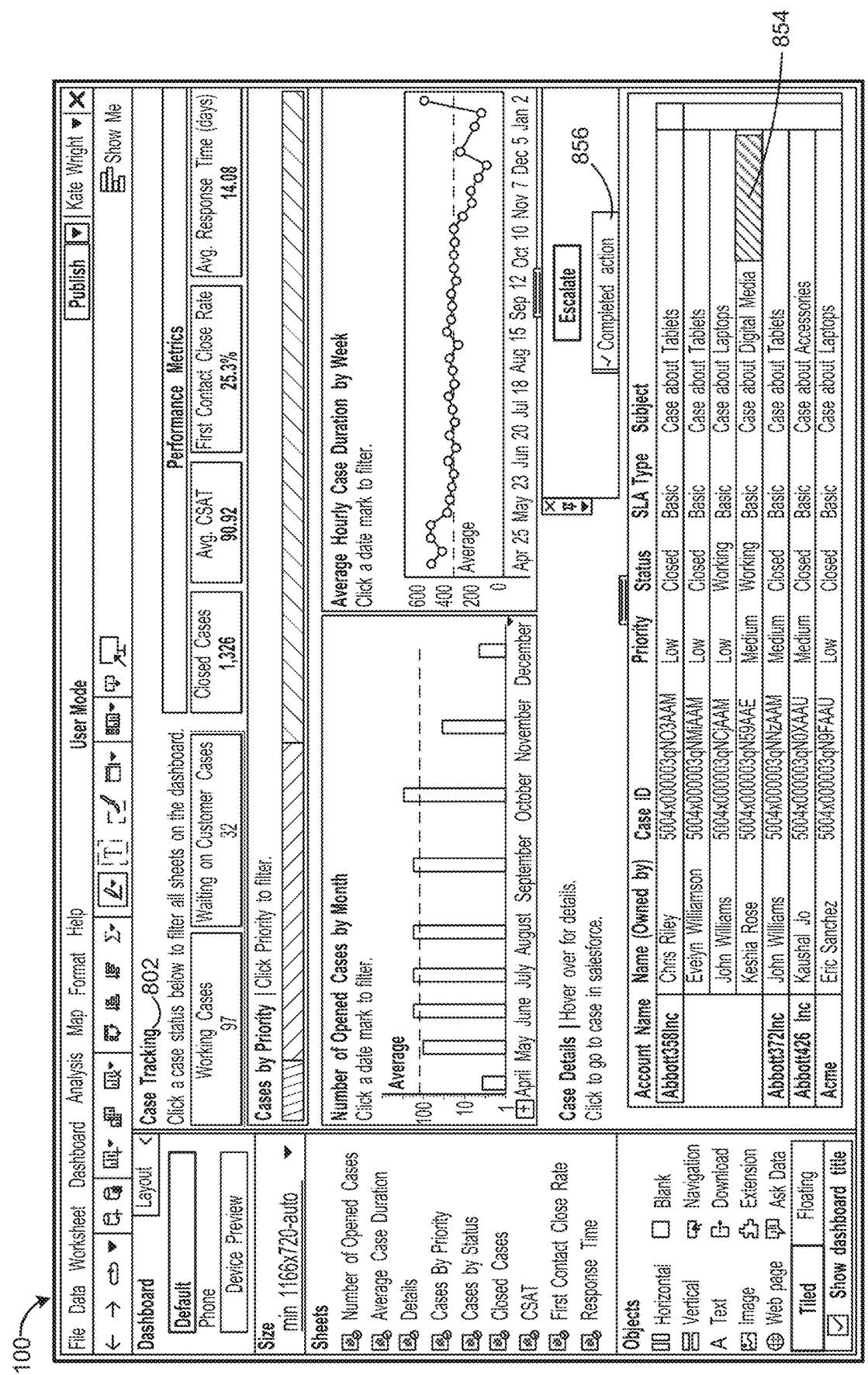

FIG. 8M illustrates user selection of a data mark 854 (e.g., a data row or a data value) from the data visualization 810 "Case Details," corresponding to a case that the user would like to escalate. FIG. 8M also illustrates activation of the interactive element 811 (the "Escalate" button) in response to the user selection of the data mark 854. FIG. 8N illustrates that, in response to user selection of the interactive element 811, the graphical user interface displays a notification 856 (e.g., "Completed Action") indicating that the case has been escalated.

In some implementations, the user selects one data mark and selects the interactive element 811 (e.g., the user clicks on the "Escalate" button once) to escalate a case.

In some implementations, the user selects multiple data marks and selects the interactive element 811 (e.g., the user clicks on the "Escalate" button once after selecting the multiple data marks) to escalate a case. In some instances, the action is configured to occur individually for each selected mark (e.g., escalate multiple cases). In other instances, the action is configured to occur once for an aggregation of the selected marks.

Figure 8O:
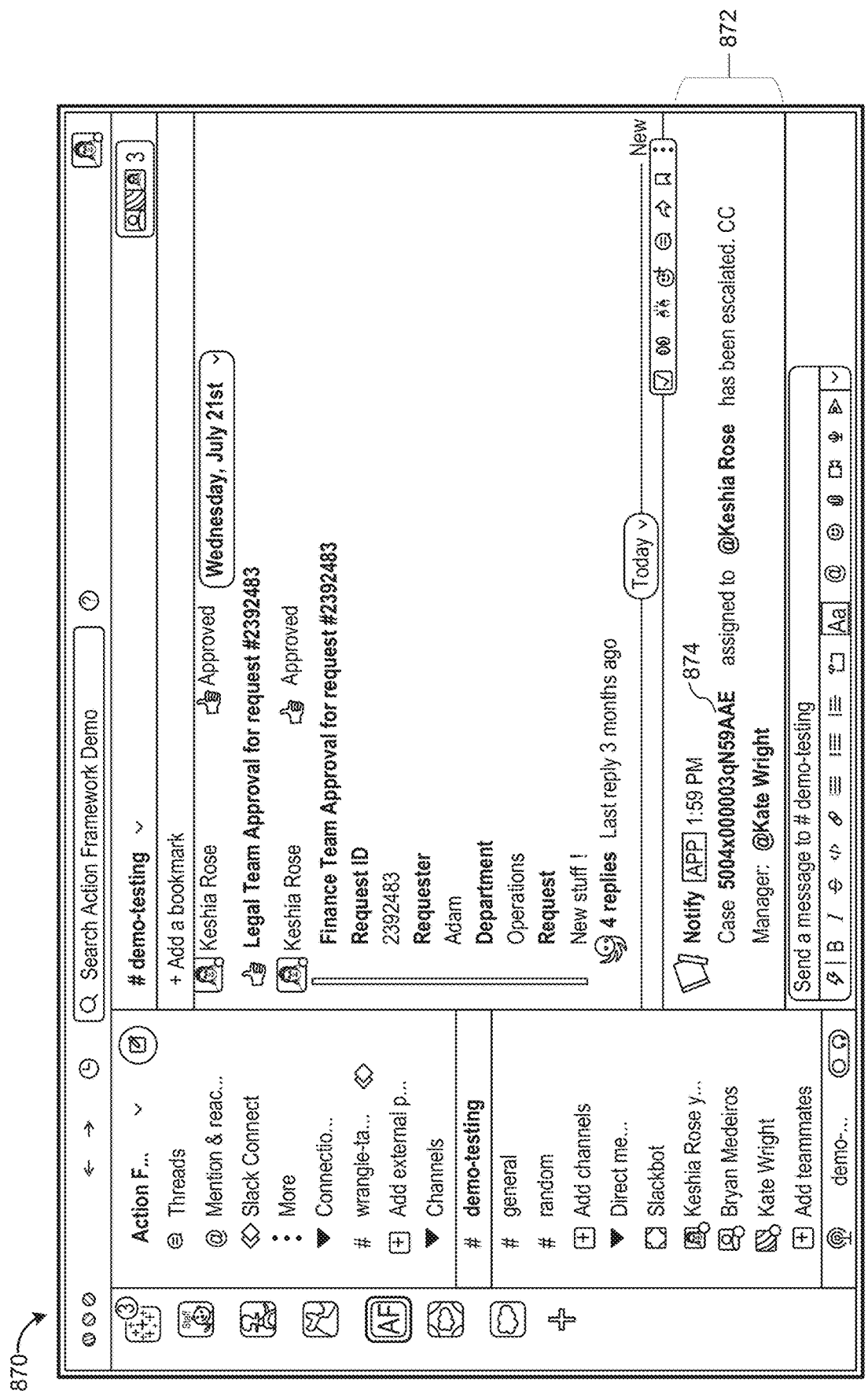
Figure 8P:
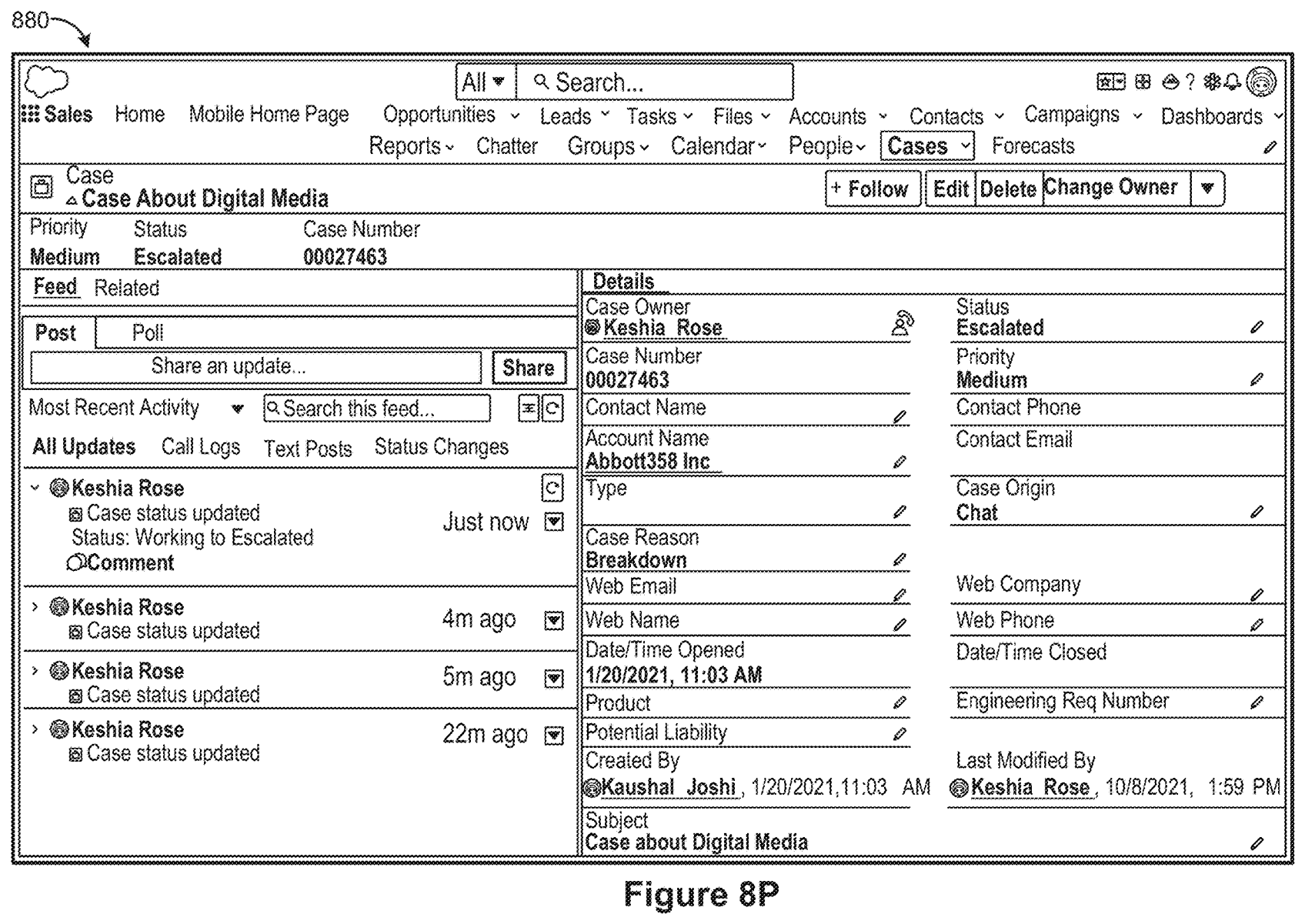

FIG. 8O illustrates a user interface 870 corresponding to a Slack® application. In some implementations, the end user receives a notification 872 in Slack® that the case has been escalated. In some implementations, the notification includes a link 874 (e.g., a URL) that, when selected, displays a user interface 880 that provides details about the case, as illustrated in FIG. 8P.

Figure 9A:
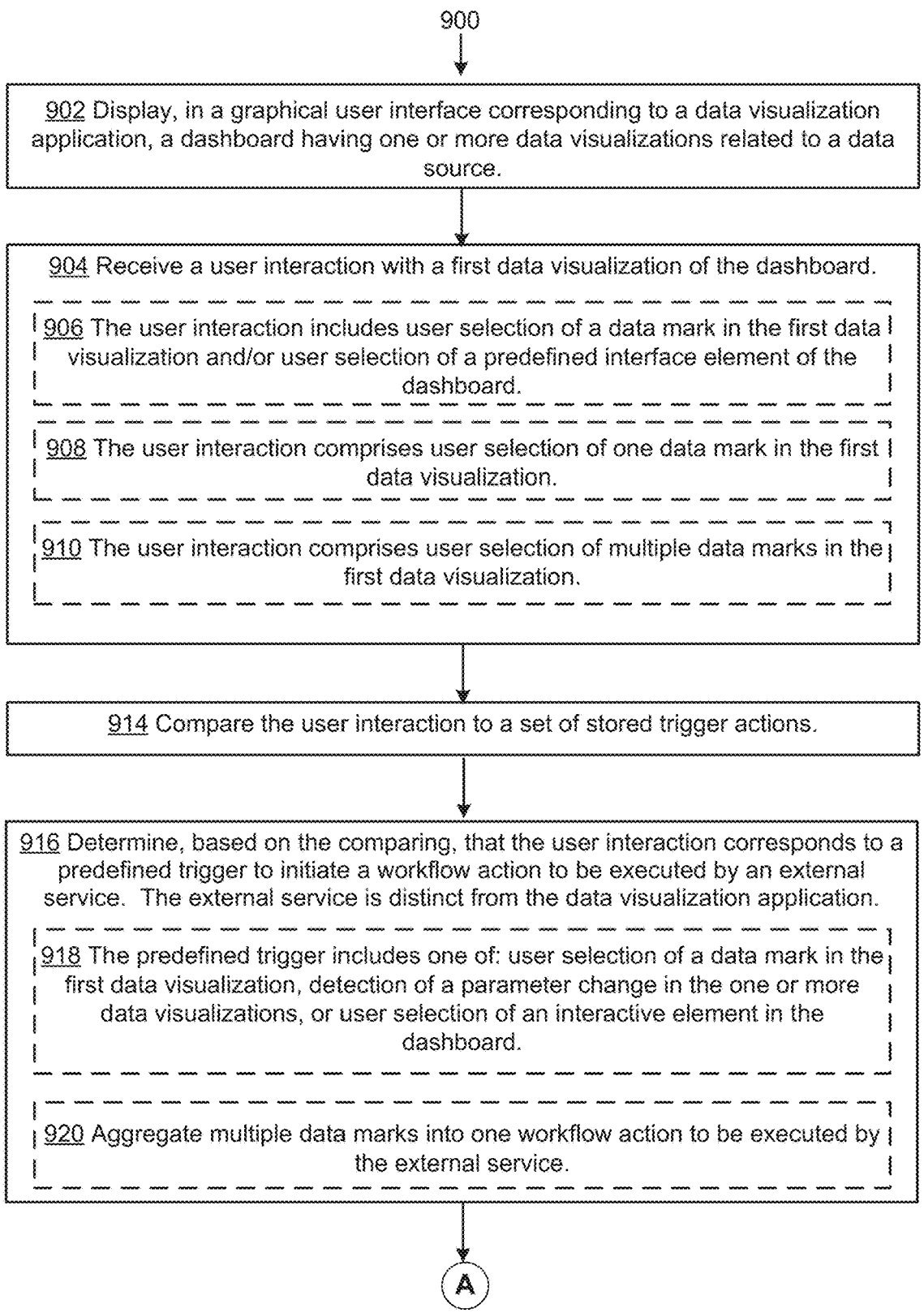
FIGS. 9A-9C provide a flowchart of a method for executing remote workflows using analytical dashboards according to some implementations.
Figure 9B:
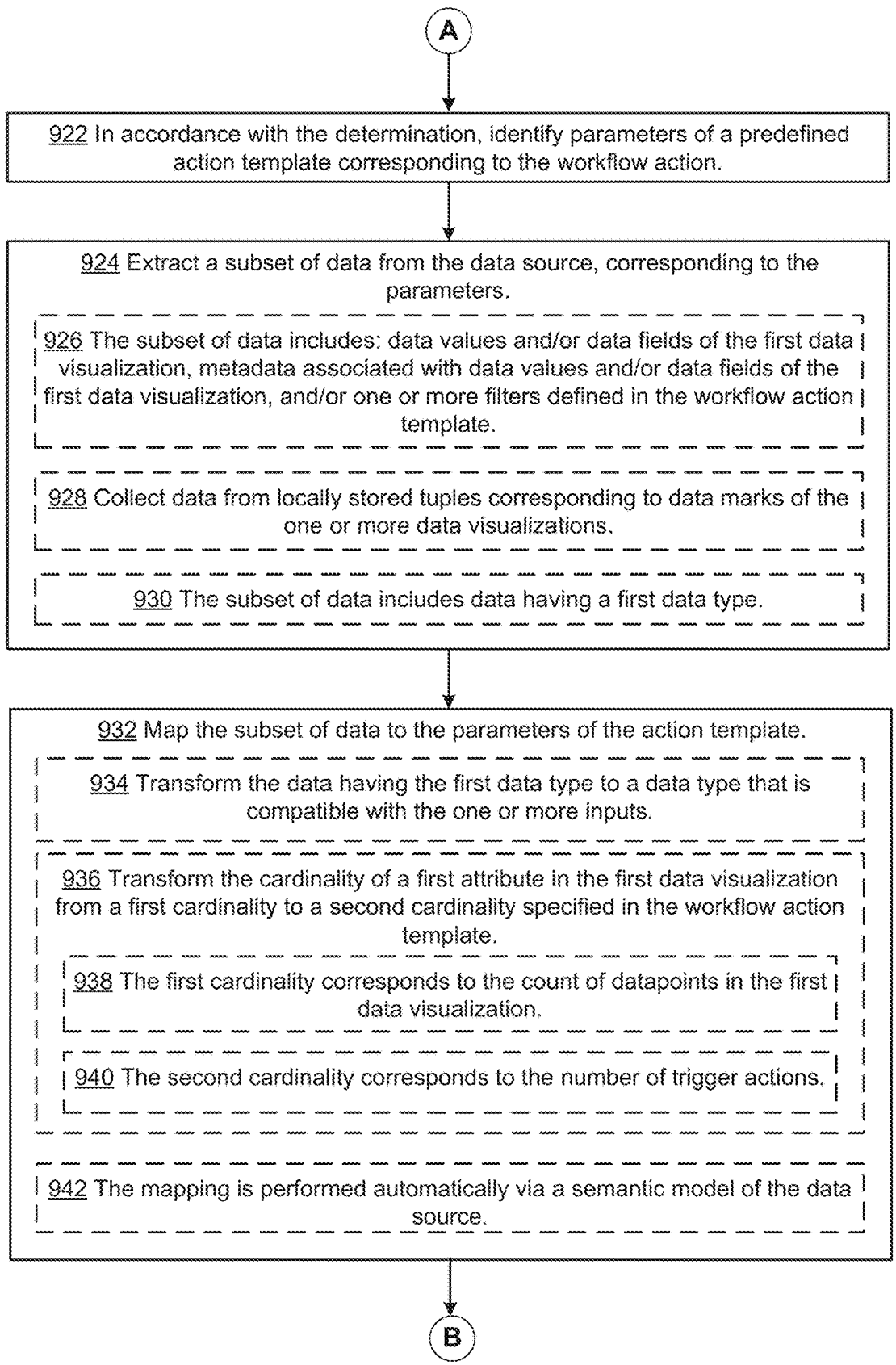
Figure 9C:
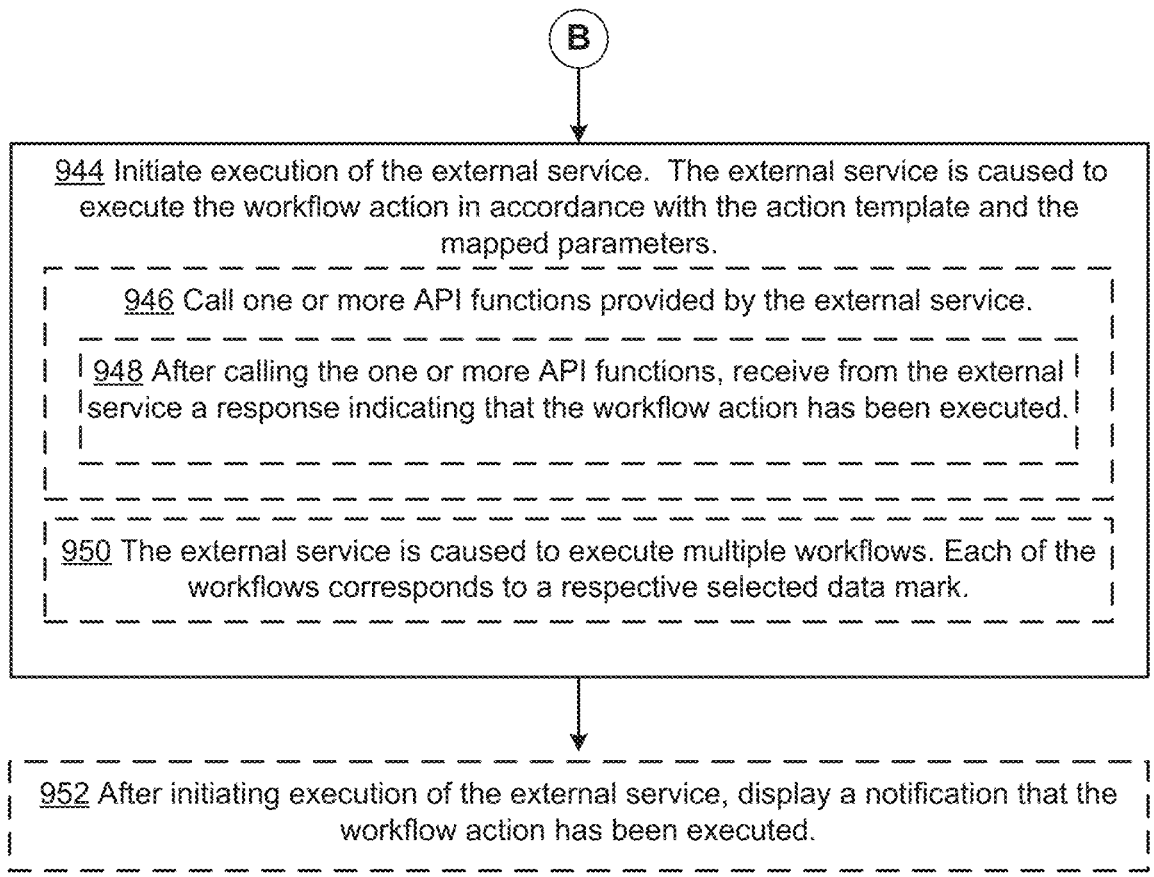

FIGS. 9A-9C provide a flowchart of a method 900 for executing remote workflows using analytical dashboards according to some implementations. The method 900 is also called a process.

The method 900 is performed at a computing device 200 that has a display 208, one or more processors (e.g., CPU(s)) 202, and memory 206. The memory 206 stores one or more programs configured for execution by the one or more processors 202. In some implementations, the operations shown in FIGS. 1, 4A-4C, 5A-5C, 6, 7, and 8A-8P correspond to instructions stored in the memory 206 or other non-transitory computer-readable storage medium. The computer-readable storage medium may include a magnetic or optical disk storage device, solid state storage devices such as Flash memory, or other non-volatile memory device or devices. In some implementations, the instructions stored on the computer-readable storage medium include one or more of: source code, assembly language code, object code, or other instruction format that is interpreted by one or more processors. Some operations in the method 1200 may be combined and/or the order of some operations may be changed.

The computing device 200 displays (902), in a graphical user interface corresponding to a data visualization application (e.g., the graphical user interface 100), a dashboard (e.g., a data dashboard 802) having one or more data visualizations (e.g., the data visualizations 804, 806, 808, and 810) related to a data source 258.

The computing device 200 receives (904) a user interaction with a first data visualization of the dashboard. For example, FIG. 8M illustrates user selection of a data mark (e.g., a data row) with a data visualization 810.

In some implementations, the user interaction includes user selection (906) of a data mark in the first data visualization and/or user selection of a predefined interface element (e.g., a button, an icon, or an interactive element, such as the "Escalate" button 811) of the dashboard.

In some implementations, the user interaction comprises user selection (908) of one data mark in the first data visualization.

In some implementations, the user interaction comprises user selection (910) of multiple data marks in the first data visualization.

In some implementations, the computing device 200 compares (914) the user interaction to a set of stored trigger actions (e.g., workflow actions 816) (e.g., stored on the computing device 200 or on the data visualization server 300). For example, FIG. 8B illustrates the stored workflow actions include a "Get View URL" action 816-4, a "Push Tableau Events to Slack" action 816-5, and a "Mapping a View" action 816-8. In some implementations, the computing device 200 includes other workflow actions such as "Export to Teams+Slack," "Download data to Slack," and/or "Download data to CSV." Each of the workflow actions is configured to be operable in conjunction with the data dashboard.

The computing device 200 determines (916), based on the comparing, that the user interaction corresponds to a predefined trigger to initiate a workflow action to be executed by an external service. In some implementations, the external service corresponds to an external server. The external service (e.g., a Salesforce® flow) is distinct from the data visualization application.

In some implementations, the predefined trigger includes (918) one of: user selection of a data mark in the first data visualization, detection (e.g., by the computing device) of a parameter change (e.g., a change in the data value of a data field, or a change in a data mark) in the one or more data visualizations, or user selection of an interactive element in the dashboard (e.g., a pre-defined icon, a user-selectable element, or a button click). This is illustrated in FIG. 8D.

In some implementations, the method 900 further comprises aggregating (920) (e.g., grouping) the multiple data marks into one workflow action (e.g., serializing the data marks into one string) to be executed by the external service.

With continued reference to FIG. 9B, in some implementations, the computing device 200, in accordance with the determination that the user interaction corresponds to a predefined trigger to initiate a workflow action to be executed by an external service, identifies (922) parameters (e.g., input fields) of (e.g., specified in) a predefined action template corresponding to the workflow action (e.g., the action template specifies the parameters that are needed for the workflow action). In the example of FIG. 8G, the "Escalate case" workflow action requires the parameters "Case Owner ID" 836 and "Case Record ID" 838.

The computing device 200 extracts (924) a subset of data (e.g., data values and/or data fields of the data dashboard or the first visualization, or metadata) from the data source, corresponding to the parameters.

In some implementations, the subset of data includes (926): data values and/or data fields of the first data visualization, metadata associated with data values and/or data fields of the first data visualization, and/or one or more filters defined (e.g., by an author who configured the workflow action) in the workflow action template.

In some implementations, extracting the subset of data from the data source includes collecting (928) data from locally stored tuples corresponding to data marks of the one or more data visualizations.

In some implementations, the subset of data includes (930) data having a first data type (e.g., string, integer, floating point, character, array, or Boolean).

The computing device 200 maps (932) the subset of data to the parameters of the action template. For example, as illustrated in FIGS. 8G to 8I, the input fields (e.g., parameters) of the "Escalate case" workflow template include "Case Owner ID" 836 and "Case ID" 838.

In some implementations, mapping the subset of data to the parameters includes transforming (934) (e.g., converting) data having the first data type to a data type that is compatible with the one or more inputs. For example, in some implementations, the data visualization application supports N different types of data types whereas the inputs take Boolean values (e.g., "0" or "1"). In this example, the computer device transforms the data in the data visualization from a first type to Boolean values so that it is compatible with the workflow action.

In some implementations, mapping the subset of data to the parameters includes transforming (936) the cardinality of a first attribute in the first data visualization from a first cardinality to a second cardinality specified in the workflow action template. For example, if a mark has a data array [comment1, comment2, comment3], this may be flattened to "comment1, comment2, comment3," such that the receiving action has a scalar input field instead of an array. In this example, the original cardinality is 3, corresponding to the array of comments, and it is converted to a single string, which has a cardinality of 1.

In some implementations, the computer device automatically transforms any data element with cardinality of more than one to a comma-delimited scalar value.

In some implementations, the first cardinality corresponds (938) to the count (e.g., number) of datapoints in the first data visualization. The second cardinality corresponds (940) to the number of trigger actions. For example, in some implementations, the first data visualization includes multiple datapoints that collectively trigger a single action. In some implementations, user selection of one datapoint can trigger multiple actions.

In some implementations, the mapping is performed (942) automatically via a semantic model of the data source (e.g., semantic model 260).

With continued reference to FIG. 9C, in some implementations, the computing device 200 initiates (944) execution of the external service. The external service is caused to execute the workflow action in accordance with the action template and the mapped parameters.

In some implementations, initiating execution of the external service includes calling (946) one or more API functions provided by the external service.

In some implementations, the API call is a REST based API, which blocks until the execution completes or until the computer device receives a "queued" response.

In some implementations, after calling the one or more API functions, the computing device 200 maintains an open (e.g., persistent) connection, which enables multiple requests to be sent, thus reducing the time needed to open new connections.

In some implementations, after calling the one or more API functions, the computing device 200 receives (948), from the external service, a response indicating that the workflow action has been executed.

In some implementations, the external service is caused (950) to execute multiple workflows. Each of the workflows corresponds to a respective selected data mark.

In some implementations, after initiating execution of the external service, the computing device 200 displays (952) a notification (e.g., on a messaging application running on the computing device, distinct from the data visualization application) that the workflow action has been executed (e.g., queued or completed) (by the external service). In some implementations, the notification includes identification of values of the one or more input fields (e.g., a Case Owner and a case ID). In some implementations, the notifications are configurable as part of the workflow.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory stores a subset of the modules and data structures identified above. Furthermore, the memory may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for executing remote workflows using analytical dashboards, comprising:
    at a computing device having a display, one or more processors, and memory storing one or more programs configured for execution by the one or more processors:
        displaying, in a graphical user interface corresponding to a data visualization application, a dashboard having one or more data visualizations related to a data source;
        receiving a user interaction with a first data mark of a first data visualization of the dashboard;
        comparing the user interaction to a set of stored trigger actions;
        determining, based on the comparing, that the user interaction corresponds to a predefined trigger to initiate a workflow action to be executed by an external service, distinct from the data visualization application:
        in accordance with the determination:
            identifying a predefined action template corresponding to the workflow action, the predefined action template specifying a plurality of parameters for execution of the workflow action by the external service;
            extracting a subset of data from the data source, corresponding to the parameters;
            mapping the subset of data to the parameters of the action template, including converting a data array of the first data mark to a scalar input field; and
            causing the external service to execute the workflow action in accordance with the action template and the mapped subset of data, including the scalar input field that is mapped to the parameters.

2. The method of claim 1, wherein the user interaction includes:
    user selection of the first data mark in the first data visualization; and/or
    user selection of a predefined interface element of the dashboard.

3. The method of claim 1, wherein the predefined trigger includes one of:
    user selection of a data mark in the first data visualization;
    detection of a parameter change in the one or more data visualizations; or
    user selection of an interactive element in the dashboard.

4. The method of claim 1, wherein the subset of data includes:
    data values and/or data fields of the first data visualization;

metadata associated with data values and/or data fields of the first data visualization; and/or one or more filters defined in the action template.

5. The method of claim 1, wherein extracting the subset of data from the data source includes collecting data from locally stored tuples corresponding to data marks of the one or more data visualizations.

6. The method of claim 1, wherein:
the subset of data includes data having a first data type; and
mapping the subset of data to the parameters includes transforming the data having the first data type to a data type that is compatible with a format of the parameters.

7. The method of claim 1, wherein mapping the subset of data to the parameters includes:
transforming a cardinality of a first attribute in the first data visualization from a first cardinality to a second cardinality specified in the action template.

8. The method of claim 7, wherein:
the first cardinality corresponds to a count of data marks in the first data visualization; and
the second cardinality corresponds to a number of trigger actions.

9. The method of claim 1, wherein the mapping is performed automatically via a semantic model of the data source.

10. The method of claim 1, wherein the user interaction comprises user selection of one data mark in the first data visualization.

11. The method of claim 1, wherein:
the user interaction comprises user selection of multiple data marks in the first data visualization; and
the method further comprises aggregating the multiple data marks into one workflow action to be executed by the external service.

12. The method of claim 1, wherein:
the user interaction comprises user selection of multiple data marks in the first data visualization; and
the external service is caused to execute multiple workflows, each of the workflows corresponding to a respective selected data mark.

13. The method of claim 1, wherein initiating execution of the external service comprises:
calling one or more API functions provided by the external service.

14. The method of claim 13, further comprising:
after calling the one or more API functions, receiving from the external service a response indicating that the workflow action has been executed.

15. The method of claim 1, further comprising:
after initiating execution of the external service, displaying a notification that the workflow action has been executed.

16. A computing device, comprising:
a display;
one or more processors; and
memory coupled to the one or more processors, the memory storing one or more programs configured to be executed by the one or more processors, the one or more programs including instructions for:
displaying, in a graphical user interface corresponding to a data visualization application, a dashboard having one or more data visualizations related to a data source;
receiving a user interaction with a first data mark of a first data visualization of the dashboard;
comparing the user interaction to a set of stored trigger actions;
determining, based on the comparing, that the user interaction corresponds to a predefined trigger to initiate a workflow action to be executed by an external service, distinct from the data visualization application:
in accordance with the determination:
identifying a predefined action template corresponding to the workflow action, the predefined action template specifying a plurality of parameters for execution of the workflow action by the external service;
extracting a subset of data from the data source, corresponding to the parameters;
mapping the subset of data to the parameters of the action template, including converting a data array of the first data mark to a scalar input field; and
causing the external service to execute the workflow action in accordance with the action template and the mapped subset of data, including the scalar input field that is mapped to the parameters.

17. The computing device of claim 16, wherein the instructions for extracting the subset of data from the data source includes instructions for collecting data from locally stored tuples corresponding to data marks of the one or more data visualizations.

18. The computing device of claim 16, wherein the instructions for mapping the subset of data to the parameters includes instructions for:
transforming a cardinality of a first attribute in the first data visualization from a first cardinality to a second cardinality specified in the action template.

19. The computing device of claim 16, wherein:
the user interaction comprises user selection of multiple data marks in the first data visualization; and
the one or more programs further include instructions for:
aggregating the multiple data marks into one workflow action to be executed by the external service.

20. A non-transitory computer-readable storage medium storing one or more programs, the one or more programs comprising instructions, which when executed by a computing device having a display, cause the computing device to perform operations comprising:
displaying, in a graphical user interface corresponding to a data visualization application, a dashboard having one or more data visualizations related to a data source;
receiving a user interaction with a first data mark of a first data visualization of the dashboard;
comparing the user interaction to a set of stored trigger actions;
determining, based on the comparing, that the user interaction corresponds to a predefined trigger to initiate a workflow action to be executed by an external service, distinct from the data visualization application:
in accordance with the determination:
identifying a predefined action template corresponding to the workflow action, the predefined action template specifying a plurality of parameters for execution of the workflow action by the external service;
extracting a subset of data from the data source, corresponding to the parameters;
mapping the subset of data to the parameters of the action template, including converting a data array of the first data mark to a scalar input field; and causing the external service to execute the workflow action in accordance with the action template and the mapped subset of data, including the scalar input field that is mapped to the parameters.

* * * * *